(12) United States Patent
Toth et al.

(10) Patent No.: US 8,086,052 B2
(45) Date of Patent: Dec. 27, 2011

(54) HYBRID VIDEO COMPRESSION METHOD

(76) Inventors: Peter Toth, Asarum (SE); József Károly, Olofström (SE)

( * ) Notice: Subject to any disclaimer, the term of this patent is extended or adjusted under 35 U.S.C. 154(b) by 1697 days.

(21) Appl. No.: 10/557,440

(22) PCT Filed: May 20, 2004

(86) PCT No.: PCT/HU2004/000055
§ 371 (c)(1),
(2), (4) Date: Nov. 18, 2005

(87) PCT Pub. No.: WO2004/104930
PCT Pub. Date: Dec. 2, 2004

(65) Prior Publication Data
US 2006/0251330 A1   Nov. 9, 2006

(30) Foreign Application Priority Data
May 20, 2003   (HU) .................................. 0301368

(51) Int. Cl.
*G06K 9/36*   (2006.01)

(52) U.S. Cl. ........................................ 382/236; 382/232

(58) Field of Classification Search .......... 382/232–251; 375/240.02–240.29
See application file for complete search history.

(56) References Cited

U.S. PATENT DOCUMENTS

| | | | |
|---|---|---|---|
| 7,330,509 B2 * | 2/2008 | Lu et al. .................... | 375/240.03 |
| 2005/0041740 A1 * | 2/2005 | Sekiguchi et al. ....... | 375/240.16 |

* cited by examiner

*Primary Examiner* — Duy M Dang
(74) *Attorney, Agent, or Firm* — Ladas & Parry LLP

(57) ABSTRACT

The invention concerns a method for compressing a digitally coded video frame sequence. In the method, a given frame is divided into blocks, and the information content of selected blocks is modified, relying on information contained in a neighboring block or blocks (prediction), and the blocks are converted from spatial representation into frequency representation. The information content of the transformed blocks is encoded by arithmetic coding. The efficiency of the coding is improved by various methods, such as dynamically partitioning the blocks into sub-blocks, or performing a compressibility analysis is the blocks before carrying out further transformations. The entropy coding uses a neural network to determine the parameters of the arithmetic coding. The frames are dynamically re-scaled, depending on available bandwidth and quality of the coded image.

60 Claims, 15 Drawing Sheets

HYBRID VIDEO COMPRESSION METHOD

Figure 1:
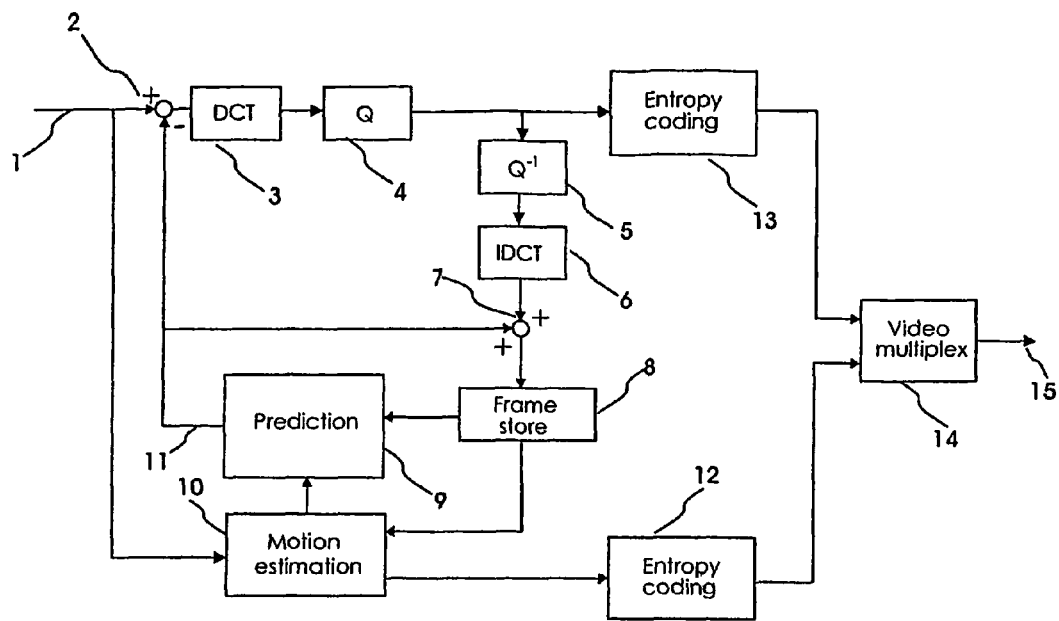

The invention relates to video compression, more particularly to a method and apparatus for compressing a video frame sequence.

Multimedia plays an ever-increasing role in everyday life. Digital video images (moving images) can be found almost everywhere.

The amount of information contained in digital video calls for the improvement of the transfer bandwidth of digital video systems and for higher-capacity storage devices. An evidence of progress in the latter field is the rocketing increase of the capacity of Flash-type semiconductor memory modules in recent years. Unfortunately,; the information content of digital video is extremely high, which makes it practically impossible or at least very expensive to use semiconductor memory for storing video digital data.

For instance, a single minute of full-resolution (D1) digital video needs 1,866 Gbyte storage capacity without compression. The bandwidth may reach 248 000 kbit/s.

In the early 1990s, the video encoding system known as MPEG1 appeared, which was capable of reducing the amount of digital video data to approx ⅓₀ th of the original. Due to quality issues, this system was improved, and the video encoder known as MPEG2 was born. This is applied primarily in DVD and DVB systems. An improved variety of the system, MPEG4 has been designed for the purposes of Internet-oriented, so-called streaming media.

The object of the present invention is a high-efficiency video data compression system. The proposed system makes it possible to store video data in semiconductor memory modules, permitting the application of low-cost RAM memory modules for storing video data, such RAM modules being widespread on the computer market,. Such a non-mechanic storage system (i. e. a storage system that does not contain moving parts) can be advantageously applied in TV sets and in so-called settop boxes used for satellite and cable TV applications, for intermediate storage of broadcast programs, and also as a replacement of conventional video tape recorders.

The coding system applying the inventive compression method can be also advantageously used for replacing the mechanical tape recording system of conventional video cameras, storing digital video data e.g. in Flash memory.

The proposed Hybrid Video Compression coding system enables the bandwidth of the digital data stream to be decreased to 300-600 kbit/s, while preserving good video quality, which means that for two hours of video only 4-500 Mbyte storage space is needed.

I. BACKGROUND ART

A number of different methods have been devised for compnressing video frame sequences.

During the coding process of video frames the amount of coded data is changing dynamically within minimum and maximum limits in order to maintain the desired quality and desired total data length.

Generally, known software programs perform compression control in accordance with the average coded frame length calculated for a sequence consisting of x frames. If the average length exceeds the previous average length value, the compression will be stronger (the compression ratio is increased). If the average length is smaller than the previous value, the compression ratio is decreased within specified minimum and maximum limit values.

The compression ratio is usually increased by selecting "stronger" quantization (a "rounding off" operation performed during transformations, see below). That causes higher error rate and noise. Errors are often visually conspicuous and disturbing, especially under 1 Mbit/s. Since compressibility changes from frame to frame, in case of a constant expected quality it is usually difficult to maintain the desired average frame length.

The minimum and maximum length values usually cannot be set too high, because that would result in the control range becoming too wide and the coded length varying over too large a scale. It is often the case that the specified minimum value cannot provide the desired quality so it would be necessary to further increase the compression ratio.

I.1. The MPEG Method

One of the most widespread and known methods for compressing video data is MPEG. It can be regarded a hybrid coding method, as it unites the compression based on spatial redundancy and the compression based on temporal redundancy.

The method based on spatial redundancy either reduces the information content of the frame by reducing details, or by recognizing and exploiting recurring features in the frame. The compression method relying on temporal redundancy, on the other hand, uses preceding and subsequent frames, and encodes only these changes.

One of the known methods for still image compression is JPEG. The method is also based on exploiting spatial redundancy. The image to be compressed is divided into blocks, and the information content of the blocks is reduced using discrete cosine transformation.

For easier comprehension of the novel features of the invention, let us briefly review the operation of the known MPEG system. The operation of the system is illustrated in FIG. 1, showing the functional elements thereof. Received blocks to be compressed are passed to selector 2 through input line 1. The selector 2 decides if the given block is an intra-, inter-, or predicted block, and treats it accordingly. The block, having passed the DCT (discrete cosine transform) module 3 and quantization module 4, is coded in the entropy coding module 13 and is written out through video multiplexer 14 onto output 15, into the compressed output data stream which is to be transmitted or stored. Transformed data of intra/inter blocks (see the explanation below), are reconstructed by inverse quantization module 5, IDCT (inverse cosine transform) module 6 and selector 7, and these data are finally written into reference frame store 8. As it is explained in detail below, the quantization module 4 essentially divides the elements of the DCT transformed block (the DCT coefficients) with the quantization factor. Coefficients are reconstructed by the inverse quantization module 5, in practice by multiplying them with the quantization factor. In other words, the inverse quantization module attempts to restore the original values of DCT coefficients, at least to the extent possible, allowed by the errors arising from the integer division. This is done with the intention of immediately decoding each frame or each block within a frame. The immediate decoding is necessary because the method uses the decoded frame as reference for coding the next frame. This procedure does not include entropy coding(decoding), because it would be superfluous, considering that entropy coding does not cause information loss which should be taken into account in the decoded reference frame.

The first frame has no reference, which means that it is always a so-called intra frame (I frame). Thus, with the first frame the above procedure is repeated until the entire I-type frame is processed. Frames or blocks that use the previous or subsequent frame as reference are called respectively P- and B-type frames/blocks.

Blocks of the next received frame are fed into the motion estimation module 10 that attempts to find a reference block for the block to be coded in the reference frame stored in reference frame store 8.

The motion estimation module 10 performs motion compensation using the found reference block, then the (original) block to be coded is subtracted from the reference block by prediction module 9, with the difference being passed on to the modules carrying put the above transformations: to selector 2, DCT transformation module 3 and quantization module 4, then to entropy coding module 13, and finally to multiplexer 14. The motion vector (MV), produced as the result of motion compensation, is coded by the entropy coding module 12 and is passed on to the multiplexer 14, which inserts the motion vector into the output data stream 15.

The 7 module is a selector/sum module that leaves data of I-type blocks unchanged, while in case of P- and B-type blocks adds the found reference block to the inverse transformed differences. The block thus reconstructed is subsequently written into the reference frame store.

Positions found during the search are converted into vectors and coded by the entropy coding module 12.

These operations will now be described in more detail.
I.2.1.

Figure 2:
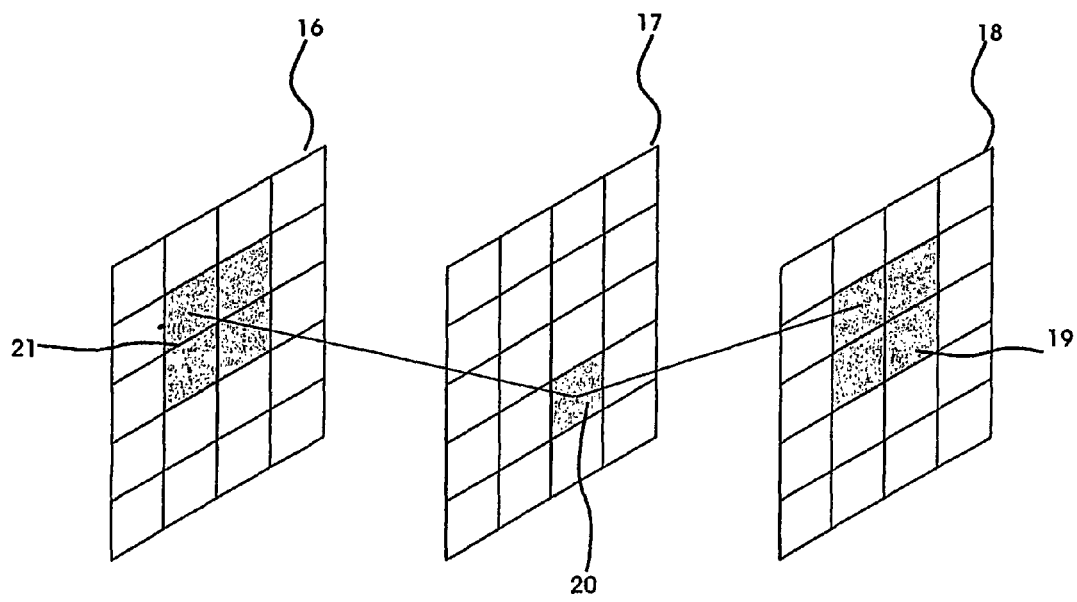

Compression systems relying on temporal redundancy encode only the changed portions of consecutive frames. In practice, this is done by dividing the frames into blocks and comparing individual blocks pixel by pixel with pixels located in a search range of the previous or the subsequent frame. The procedure is illustrated in FIG. 2, showing that a reference block best matching a given block 20 of a frame 17 is being searched for in the search range 21 located in the previous frame 16 or in the search range 19 of the subsequent frame 18. The reference block can be located anywhere, it need not coincide with the search ranges (shown in grey) designated in the reference frames 16 or 18. It may of course happen that in such cases the reference search is unsuccessful in the given reference frame(s). Evidently, the reference frames 17, 18 are not divided into blocks for the reference search, the blocks are shown in FIG. 2 only for the sake of better overview.

The comparison is performed using the following expression:

$$MSE(k, l; u, v) = \frac{1}{MN} \sum_{i=0}^{M-1} \sum_{j=0}^{N-1} (I_n(k+i, l+j) - I_{n-1}(k+i+u, l+j+v))^2$$

where MSE is the so-called Mean Square Error, quantifying in essence the comparison of individual pixels of the block to be coded and the sought reference block, the comparison being performed pixel by pixel, indices k,l are indices determining the position of the block to be coded, indices u,v are indices pointing to the search range located in the reference frame, and M, N are the horizontal and vertical size of the block.

Frames located consecutively before and after the frame containing the block to be coded are uniformly called reference frames.

During the search procedure, a search range with a typical size of −32/32 pixels is set up in the reference frame. The position of the current block to be coded will be designated as the centre of the search range. That is, if the coding process is currently at position 10, 10 then this position will be the centre of the search range in the reference frame. The range is scanned step-by-step with the current block and the error (the above specified MSE value) is calculated in each step. The best reference candidate will be the position where the search gives the smallest error, that is, the block best matching the current block to be coded. Based on the error value, it can be determined whether the search can be regarded successful or not. In case of a successful search the sought reference block position is obtained in full resolution mode. However, in most cases the search result is not satisfactory.

If we examine the issue in more detail, it soon turns out that the cause of excessive errors (and therefore unsuccessful searches) is the error measurement method. For instance, in case of noisy frames even in the best position the two blocks cannot be identical, the information content of the blocks is different just because of the noise. This situation also arises when the displacement of a block is not the exact multiple of the pixel size, the displacement ends somewhere between two integer pixels, i. e. the real displacement can only be exactly expressed as a fraction of the pixel size.

Therefore, in order to provide a proper match between the current block and its reference, the noise and other disturbing factors should be filtered. Usually low-pass filters are applied for that purpose. The filters perform the damping of high-frequency components depending on the predetermined sampling frequency, and are thereby able to suppress picture noise to some extent. Filters usually compensate errors by averaging each pixel with pixels located beside or above it, or with both. For instance, the so-called ½ pixel-resolution reference frame is produced by inserting a pixel between every two neighbouring pixels of the original frame, with the average value of the two neighbouring pixels. The result is substantially the same if a new pixel is created from the average values of every two neighbouring pixels, using the new pixels to create a new frame with a resolution identical with the original. This frame is practically shifted ½ pixel left relative to the original in case it was interpolated horizontally, and ½ pixel up in case it was interpolated vertically.
I.2.2.

For error compensation, usually bilinear filters are proposed. Bilinear filtering involves creating three interpolated (filtered) reference frames, namely one with vertical, one with horizontal, and one with both vertical and horizontal interpolation. It should be remembered that a reference frame is the decoded (reconstructed) variety of a coded intra (or inter) frame. This is done in order to prevent further frames, which are based on the given reference frame, from being further deteriorated by the quantization error present in the decoded reference frame.

In the next phase the search is carried on with ½ pixel resolution (that is, it is continued in the filtered reference frame). A selector S is generated from the bits of the matched x, y position using the expression S=(y & 1)*2+x & 1 (where & stands for a logical AND operation). Next, a new search range is established with limits −1/+1, −1/+1, i.e. at (x+(−1/+1),y+(−1/+1)), with the position of the best block, found in the first search phase (the search in the non-filtered reference), set as the centre of the range.

Figure 3:
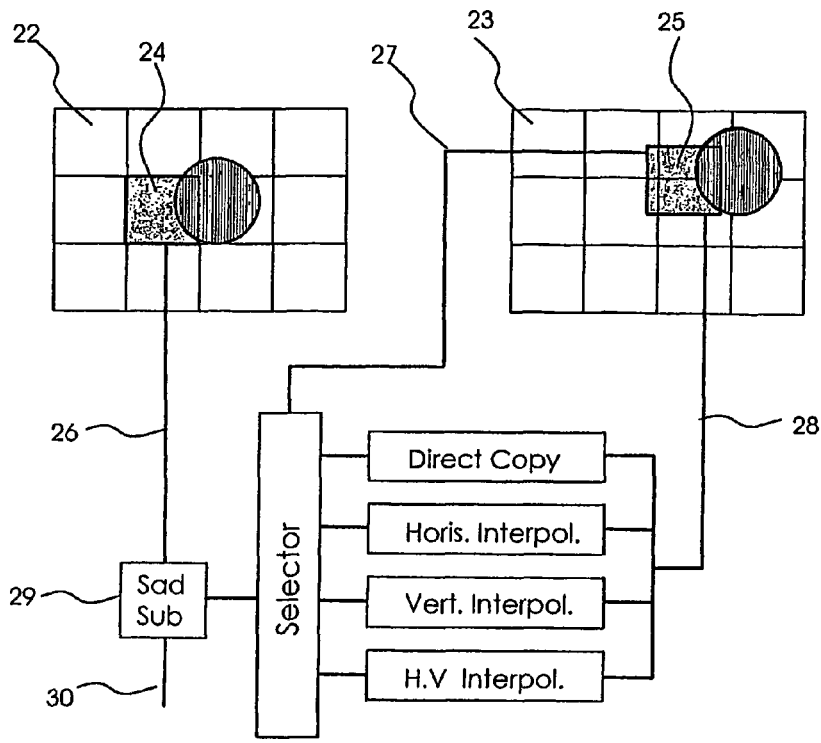

Now the search is repeated using the new range. The selector picks the required interpolated reference frame according to the positions and also the particular block in the frame that is determined by the positions, and calculates the squared error relative to the current block. At the end of the search the position where the error was the smallest is retained. So, pixels of the current block will be subtracted from pixels of the block that was pointed to by the selector when the error was smallest. This is illustrated in FIG. 3. A block similar to or identical with block 24 of the frame 22 to be coded is sought in the reference frame 23. When the best matching block 25 is found, the contents thereof are fed into the Sad/Sub (comparison) module 29 through data line 28, with the comparison being performed using either the unfiltered, the horizontally interpolated (filtered), the vertically interpolated (filtered), or the bidirectionally interpolated (filtered) reference, depending on which one has been selected by the selector with the expression S=(y & 1) * 2+x & 1 on the basis of the position values. This procedure involves only a non-filtered reference that is locally filtered (interpolated). The procedure is the same in case three previously filtered reference frames (horizontally, vertically, and bidirectionally interpolated) are available. In that case the selector chooses the appropriate reference frame from the above alternatives (the non-filtered frame and the three differently filtered ones), and forwards the block located at position x, y for further comparison and processing.

Finally, either the squared error or, in case of the smallest-error block, the difference of the reference block 25 and the block 24 to be coded is passed on the output 30.

I.2.3.

Next, either the resulting differences—in case of a successful search—or, if the search was unsuccessful, the current block itself are converted with DCT transformation from spatial representation to frequency representation. Then the unnecessary precision of data is reduced by the so-called quantization operation. This essentially involves discarding higher-order coefficients produced by the DCT, since these coefficients are usually small. The remaining DCT coefficients are also either small values or zeroes, which may be efficiently coded by entropy coding, simultaneously with the position value established above. This procedure is illustrated in FIGS. 4-5.

Figure 4:
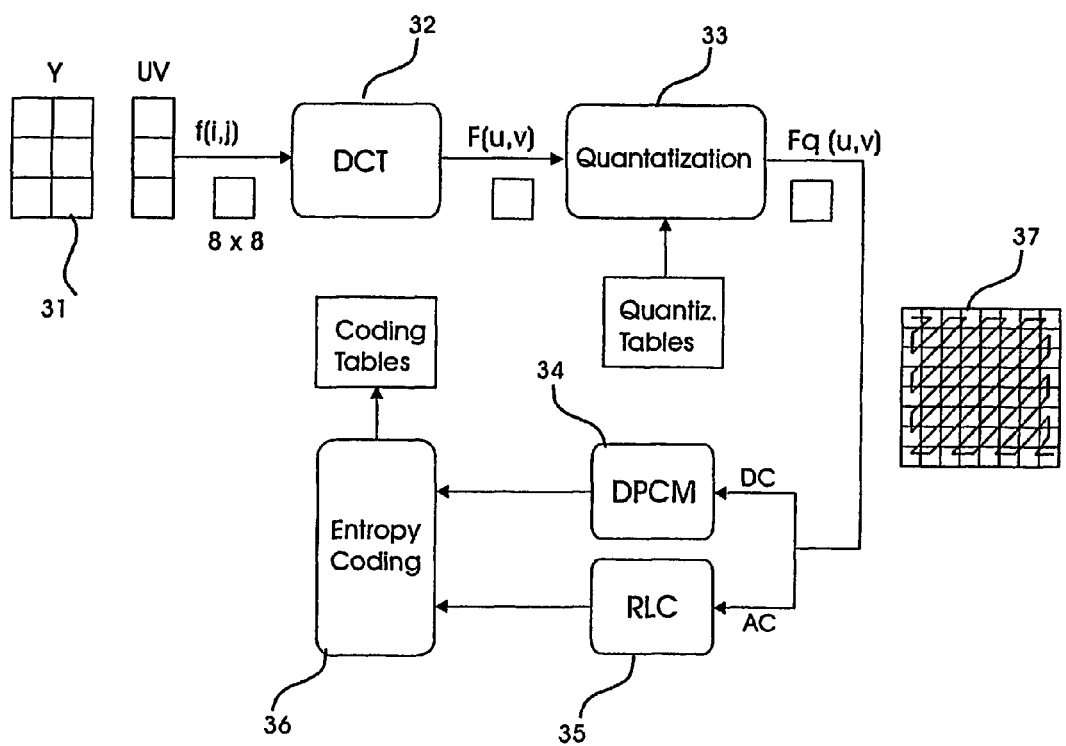

FIG. 4 shows the schematic block diagram of the coding process for an intra frame. The input frame 31 has Y, UV format where Y contains the luma information and UV contains the colour difference (chroma) information. The frame 31 comprises e.g. 8×8-pixel sized blocks. Thus, individual blocks are 8×8 matrices, with separate Y and UV blocks associated to a given frame. In the following, if it is not indicated otherwise, Y and UV blocks are coded similarly, so they are generally represented in FIG. 4 by the matrix f(i,j). The result of the DCT transformation performed in step 31 on a given block is the matrix denoted F(u,v), also comprsing 8×8 elements. Modifying the individual elements of the matrix F(u,v) in step 33 we obtain the quantized matrix Fq(u,v), designated in FIG. 4 with the reference numeral 37. As it has been already indicated earlier, quantization essentially involves the reduction of unnecessary precision of the data, carried out in practice by discarding certain elements of the F(u,v) matrix. Accordingly, hereafter the information contained in the original block is contained in the quantized matrix 37. The first element of the quantized matrix 37, the so-called DC coefficient is reduced in step 34 with delta pulse code modulation (DPCM). This essentially means that DC coefficients of subsequent blocks, having the same order of magnitude, are subtracted from one another, and in this manner smaller-amplitude DC coefficients are obtained, which can be coded more efficiently by the static Huffman entropy coding performed in step 36. The other elements of the matrices, the so-called AC coefficients, are coded applying the so-called run-length coding, which is based on recording only the occurrence count and the coefficient value for reoccurring coefficients (the procedure is described in greater detail below). DC and AC coefficients are retrieved from the quantized 8×8 matrices following the so-called Zig-Zag scan order, as illustrated at the matrix 37. Thereby the coefficients are forwarded to the entropy coder in increasing order of frequency, starting with lower-frequency coefficients, towards the higher frequency coefficients.

I.2.4.

Figure 5:
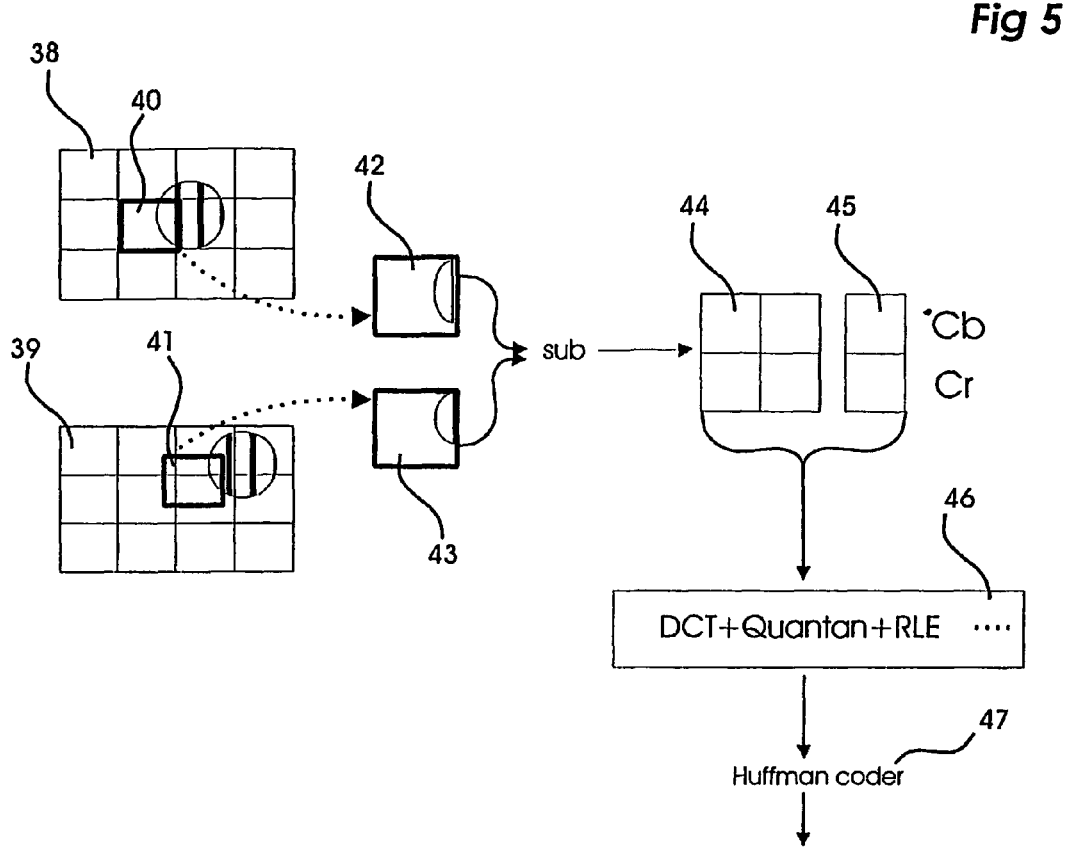

In case a block is not an intra, but an inter coded block, then FIG. 5 shows the coding of a matched and compensated P-type block. It is sought to find a reference block 43 for the block 42 to be coded. The block 42 is located in its original position 40, between the blocks 38 of current frame to be coded. The reference block 43 may be located in the position indicated with the reference numeral 41. The search is performed by stepping the block 42 to be coded through the search range 39 of the reference frame. If the best match is found, the block 42 to be coded is subtracted from the reference block 43 (or the other way round) to generate the error between the block 42 to be coded and the matched reference block 43. In this manner, the luminance 44 and chrominance 45 components of the error are obtained. These components are subjected to DCT transformation, quantization, and run-length coding in step 46, and finally, in step 47 the run-length coded data undergo further entropy coding.

Since the original frame will not be available as a reference during decoding, only an already decoded frame can be used as reference. That is why it is necessary to reconstruct reference frames from the coded data already during the process of coding. The simplest way to do this is to perform the inverse quantization and inverse DCT immediately after quantization.

In case the reference search was successful, the matched reference block is added to the inverse transformed block, and the inverse transformed block is written to the current position of the current frame. Because the frame obtained in this step will serve as a reference for the next frame, all blocks of the current frame are updated.

If the reference search was successful, the block is classified as inter block, whereas upon an unsuccessful search the block is classified as an intra block. Block classification data are needed for the decoder, because they indicate how the block was generated during the coding process. Frames are classified according to the same principle.

If no reference is found for a frame (or if the frame has changed relative to the reference to such an extent that the coding of the difference would require substantially the same amount of data as the coding of the original frame), the entire frame is transformed using DCT and is classified as an I-frame. If a frame uses only the preceding frame as reference, it is classified as a P-frame, while in case the frame uses both the preceding and the subsequent frames as reference, it is categorized as a B-frame.

Figure 6:
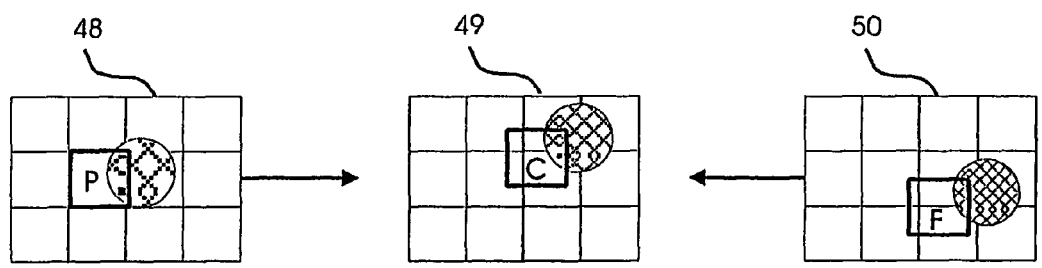

FIG. 6 illustrates that for a B-frame, the coding system searches for a reference 49 of the block C to be coded in both the preceding frame 48 and the subsequent frame 50, finally keeping as reference either the one that produced the smallest error or the linearly interpolated average of the two.

First the MSE value of the matched blocks P and C is computed, then MSE is also calculated for blocks F and C. In the following, the system calculates MSE for the block generated by the expression 0.5 * (P+F) and the block C, and the alternative yielding the smallest MSE is finally coded. That is, in case MSE of the block C was best relative to the preceding frame 48, then the block P of said frame 48 becomes the reference block for the block C. In case the best result was produced by the frame 50 following frame 49, then the block F of the frame 50 becomes the reference of C, and if the best result is obtained with the average of F and P, then both these blocks are used as references for C. If none of the results were good enough, then the block is coded as an intra block. The block descriptor structure must always show the source of the reference, that is, how the block C was coded.

I.2.5.

In case of a successful reference search, the established reference positions are converted to vectors and the vectors are coded. The vectors specify the magnitude and the direction of the displacement of the block to be coded relative to the reference.

The application of DCT can be justified by the following facts:

In case a portion of coefficients is deleted (zeroed out), the inverse DCT transformation is capable of reconstructing the original block data with a very good approximation.

The question may arise: why use DCT when it is only a variety of FFT? The answer is that there is empirical evidence that DCT gives better function approximation for video encoding than FFT. This is illustrated with some concrete values shown as examples in FIG. 7. The FFT coefficients 52 and DCT coefficients 53 are produced by performing, respectively, FFT and DCT transformations on the input data 51. After quantization (that is, after discarding or truncating coefficients) the truncated FFT coefficients 54 and truncated DCT coefficients 55 are obtained. Following the inverse transformations the IFFT reconstructed data 56 and the IDCT reconstructed data 57 are obtained. Plotting the reconstructed data with the curves 58 and 59 it is seen that FFT is more sensitive to coefficient truncation.

I.2.6.

The purpose of quantization is the reduction of the precision of frame data (the level of the details), discarding unnecessary details.

If a given block is subjected to close examination, it can be noticed that the block contains many details that are not perceived visually. The reason is that the sensitivity of the human eye increases toward lower spatial frequency components. Thus, if higher-frequency components of the frame are more strongly damped than lower-frequency components, up to a certain limit no change can be visually perceived in the decoded frame, though the compressibility of the data has increased. This kind of quantization is applied by the MPEG1-2 standards. According to another known method, the fequency distribution of the coefficients is disregarded, so each coefficient will be divided by the same constant (H26x-MPEG4). The most important function of quantization is the reduction of the number of bits that describe the DCT coefficients. In other words, it is desired to describe DCT transformed coefficients with as few bits as possible. The fewer the number of bits describing a coefficient, the better the compressibility will be. However, the error caused by the integer division also increases when the value of the divisor is increased.

There exist other known methods for reducing the number of bits representing DCT coefficients. For example, the so-called DC (delta code) prediction is based on the recognition that values located at the 0-th position of consecutive DCT blocks are only slightly different from each other. Hence, it is possible to reduce the value of the DC components and also the number of bits representing these values if a DC value is subtracted from the preceding one. (The coefficient located at the 0-th position of a block is called DC, while others are called AC.)

The process of AC prediction is similar to DC prediction, with the difference that coefficients are scanned in different directions, and are averaged using various methods. A number of solutions are known for AC/DC prediction, so it is not needed to describe them in detail here.

II.

The general objective of the invention is to improve the compression efficiency of the known method presented above, or more particularly, to provide efficient compression with relatively low computational load. This aim has been achieved with the inventive methods described in the independent claims attached to this description Although the above methods can be effectively applied by themselves, their simultaneous use can result in especially significant improvements, on the one hand because the effects of individual methods are added, and on the other hand because the individual methods concern different phases of the compression process.

Other apparatuses and software (computer program products) performing the steps of the inventive methods, and other, substantially inverse methods carrying out the decompression of coded data are also the objects of the present invention.

Figure 7:
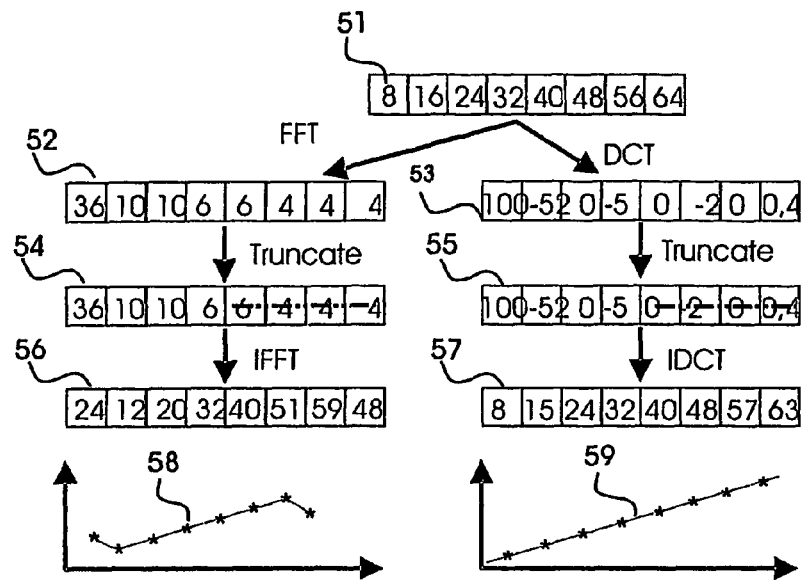
Figure 8:
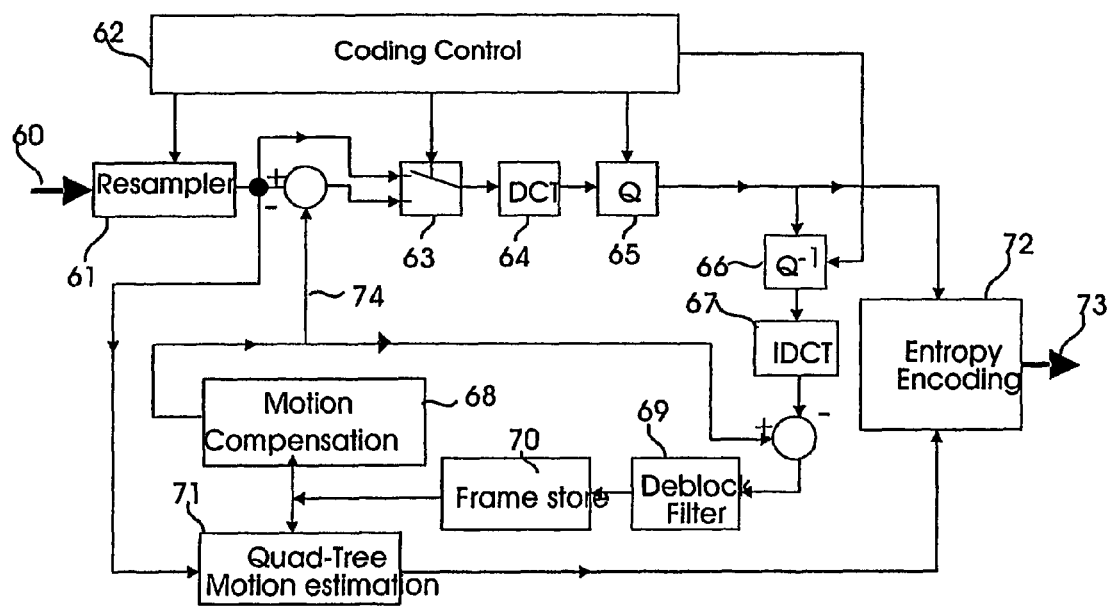
Figure 9:
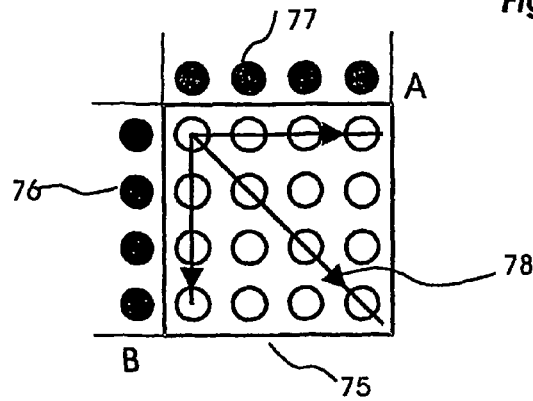
Figure 10:
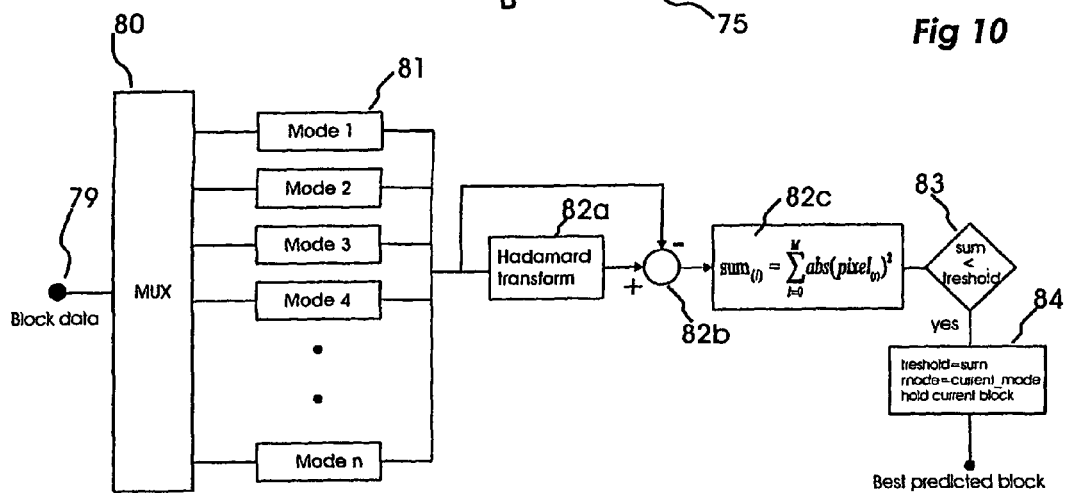
Figure 11:
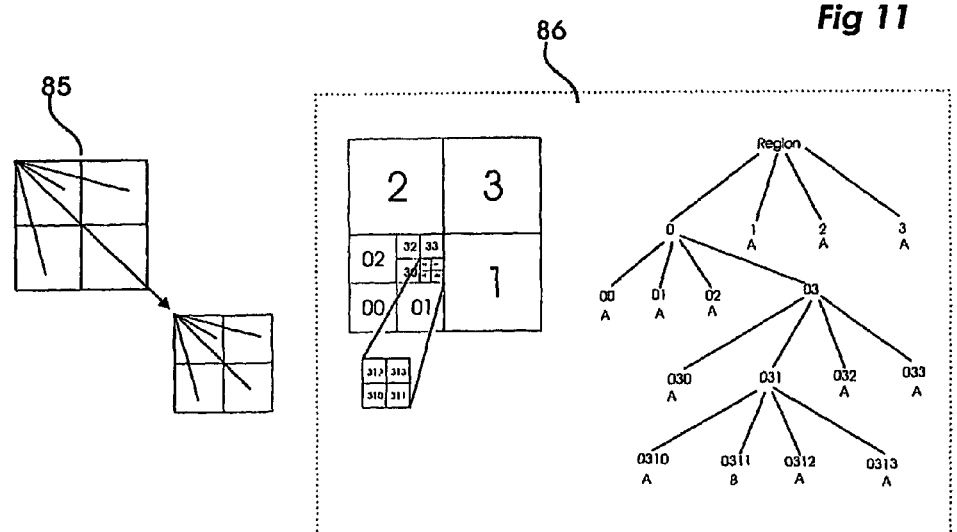
Figure 12:
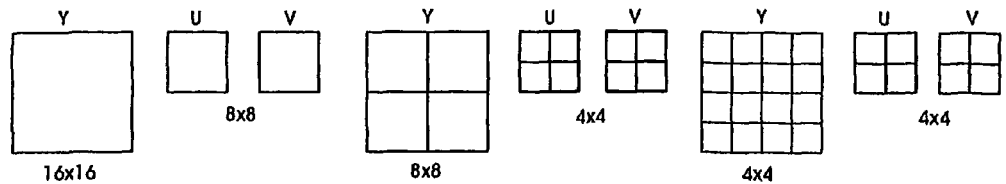
Figure 13:
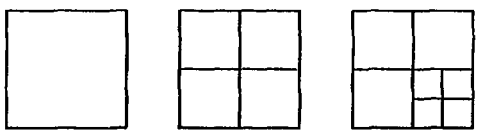
Figure 14:
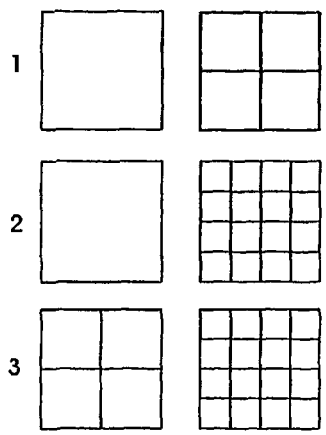
Figure 15A:
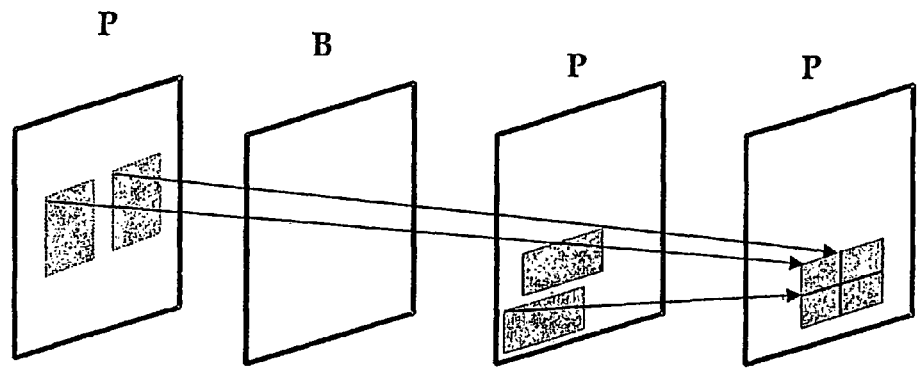
Figure 15B:
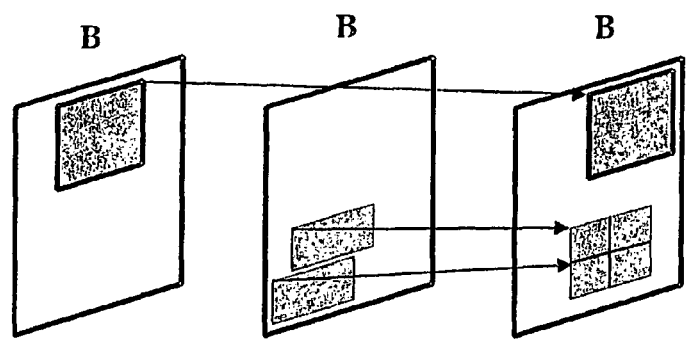
Figure 15C:
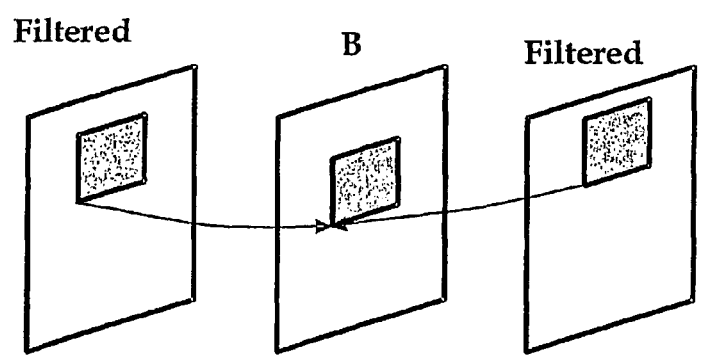
Figure 16:
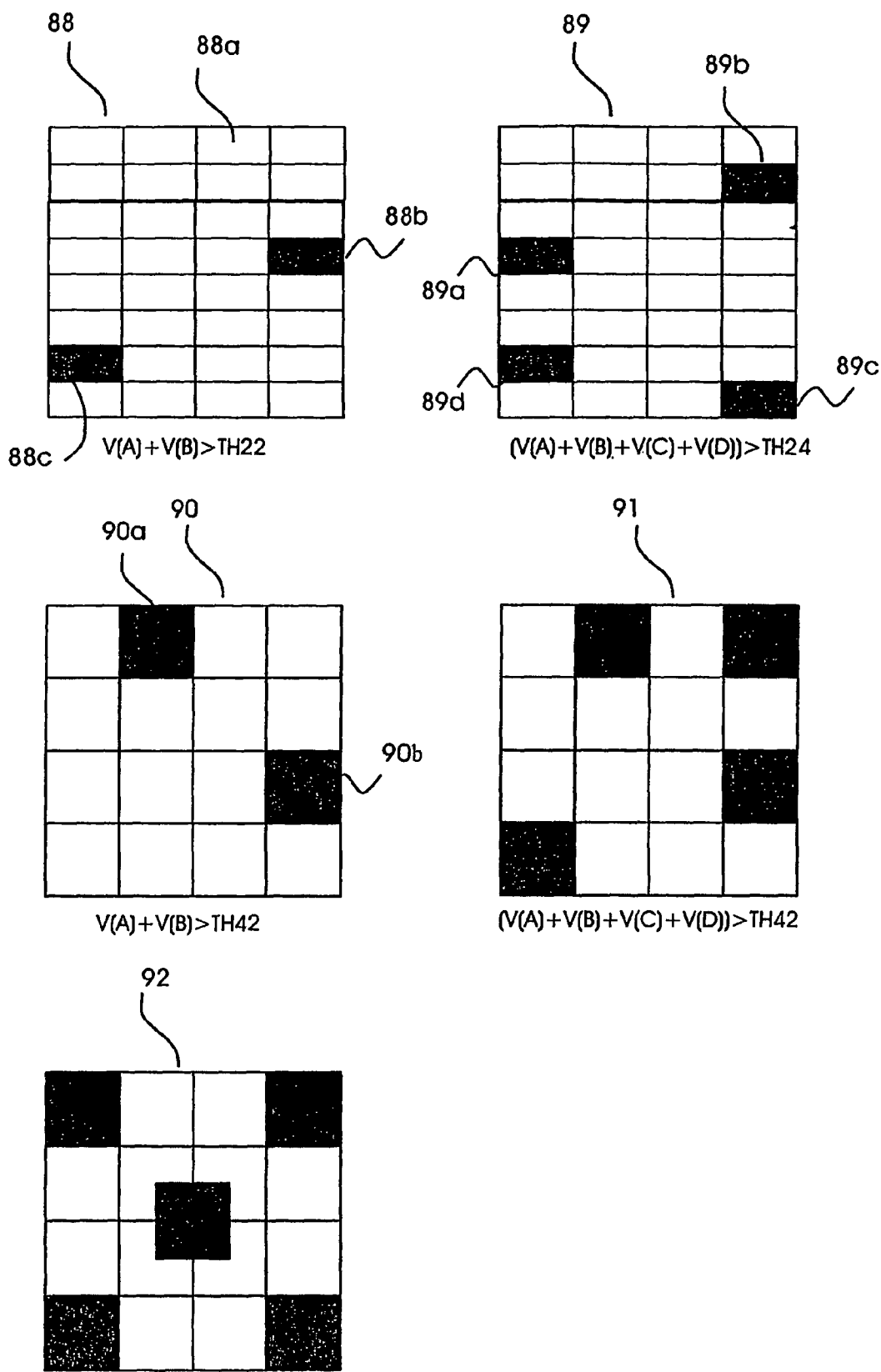
Figure 17:
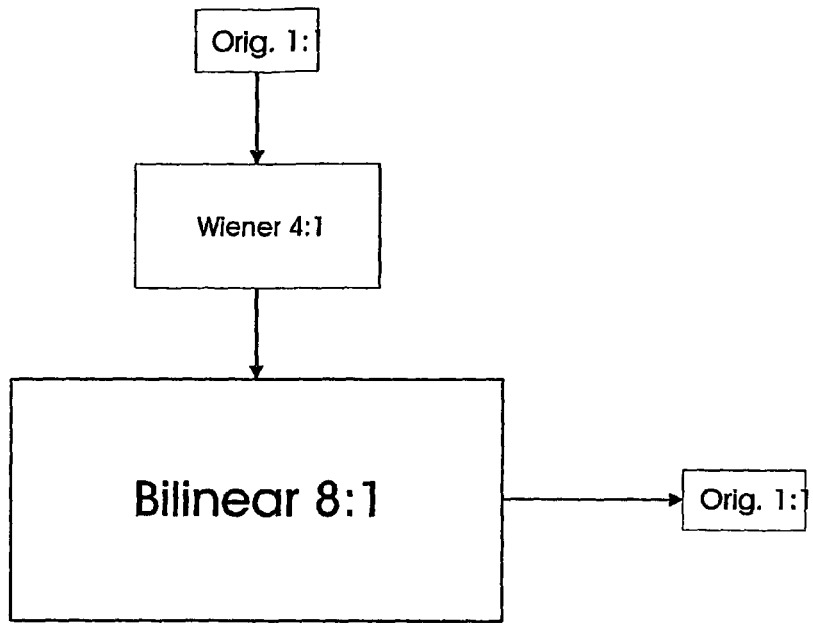
Figure 18C:
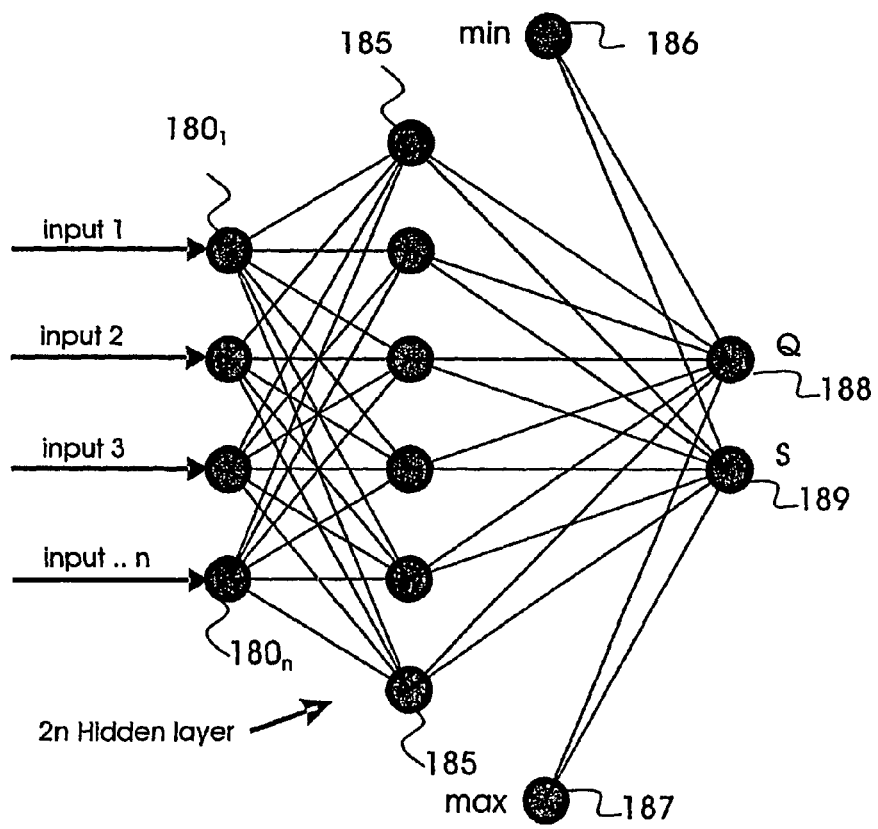
Figure 18A:
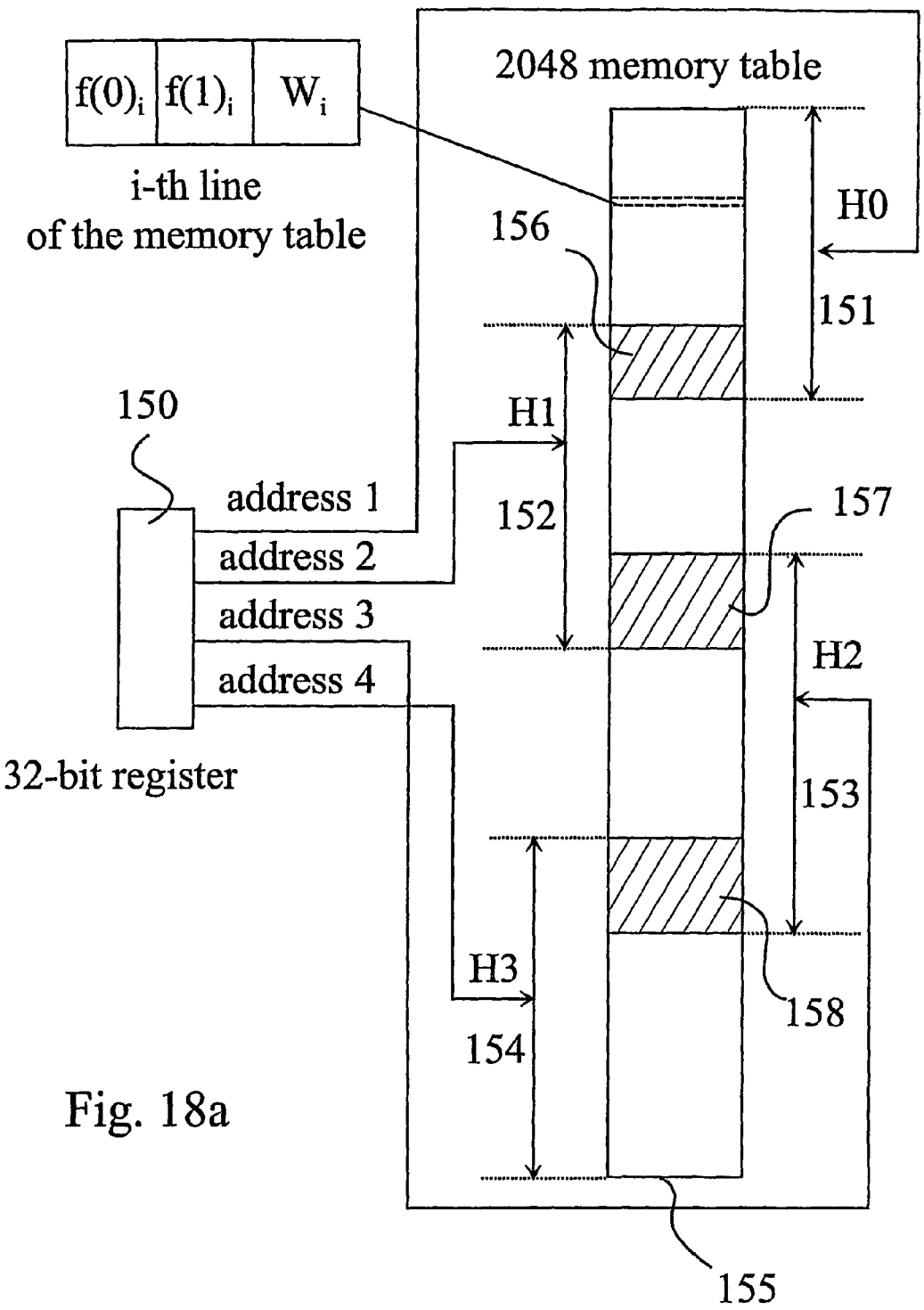
Figure 18B:
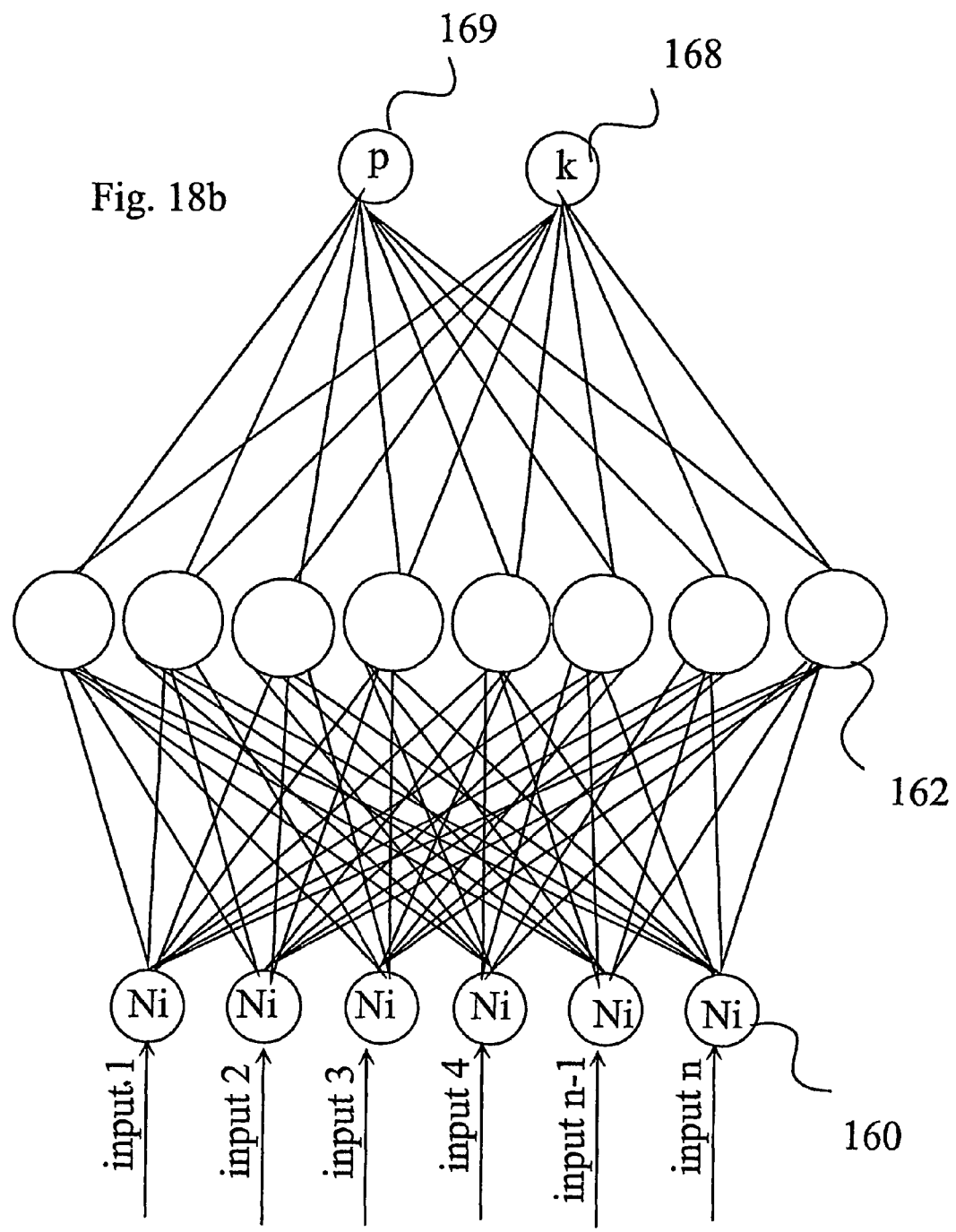

The invention is explained in detail with reference to the attached drawings, where FIG. 1 shows a schematic block diagram of prior art MPEG encoding, FIG. 2 illustrates the method of finding inter frames, FIG. 3 illustrates the method for comparing the reference block and the block to be coded, FIG. 4 shows the steps of the DCT transformation, quantization, and subsequent entropy coding, FIG. 5 illustrates the method of subtracting the block to be coded from the reference block, FIG. 6 illustrates the process of searching for reference frames among previous or subsequent frames, FIG. 7 shows differences between the DCT and FFT methods, FIG. 8 is a schematic functional diagram of the inventive hybrid video encoder, FIG. 9 illustrates the prediction modes of intra blocks, FIG. 10 illustrates how the prediction mode is selected from possible prediction modes FIG. 11 shows an embodiment of the encoding of the block partitioning, FIG. 12 shows possible block partitionings that use sub-blocks of different sizes, FIG. 13 illustrates the partitioning that comprises three different block sizes, FIG. 14 illustrates the partitioning comprising two different block sizes, FIGS. 15a-c show search modes applicable with P and B frames, FIG. 16 illustrates the reference search method that uses reduced samples, showing block sizes and block patterns used during the search process, FIG. 17 shows how the interpolated reference frames used in the method according to the invention are generated, FIG. 18a illustrates the selection (addressing) of neurons in the neural arithmetic coding unit according to the invention, and also shows the layout of unions within the address range, FIG. 18b shows the schematic diagram of the neural network applicable for an embodiment of the neural bandwidth control system according to the invention.

Figure 19:
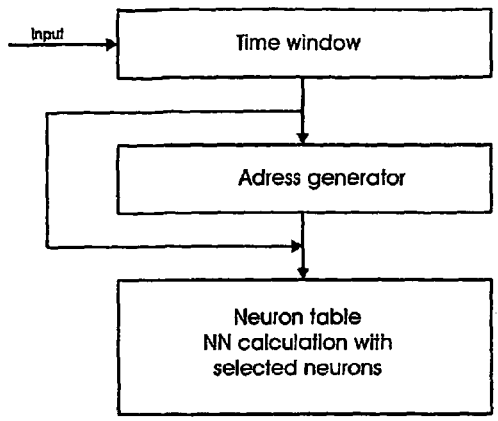
Figure 20:
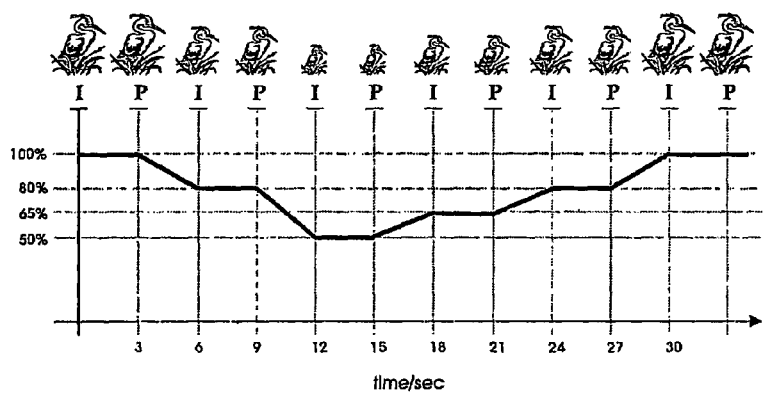
Figure 21:
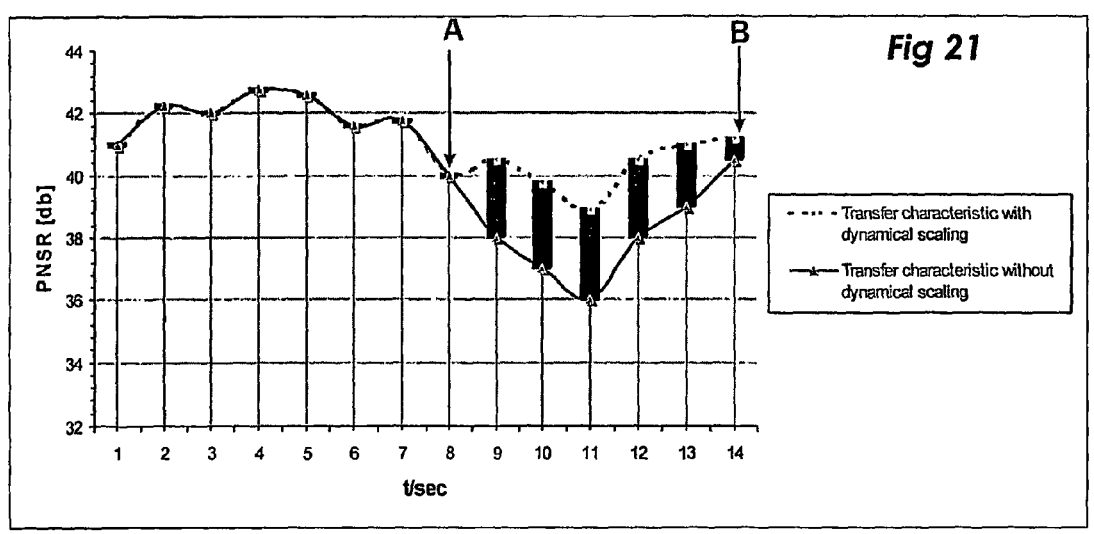
Figure 22:
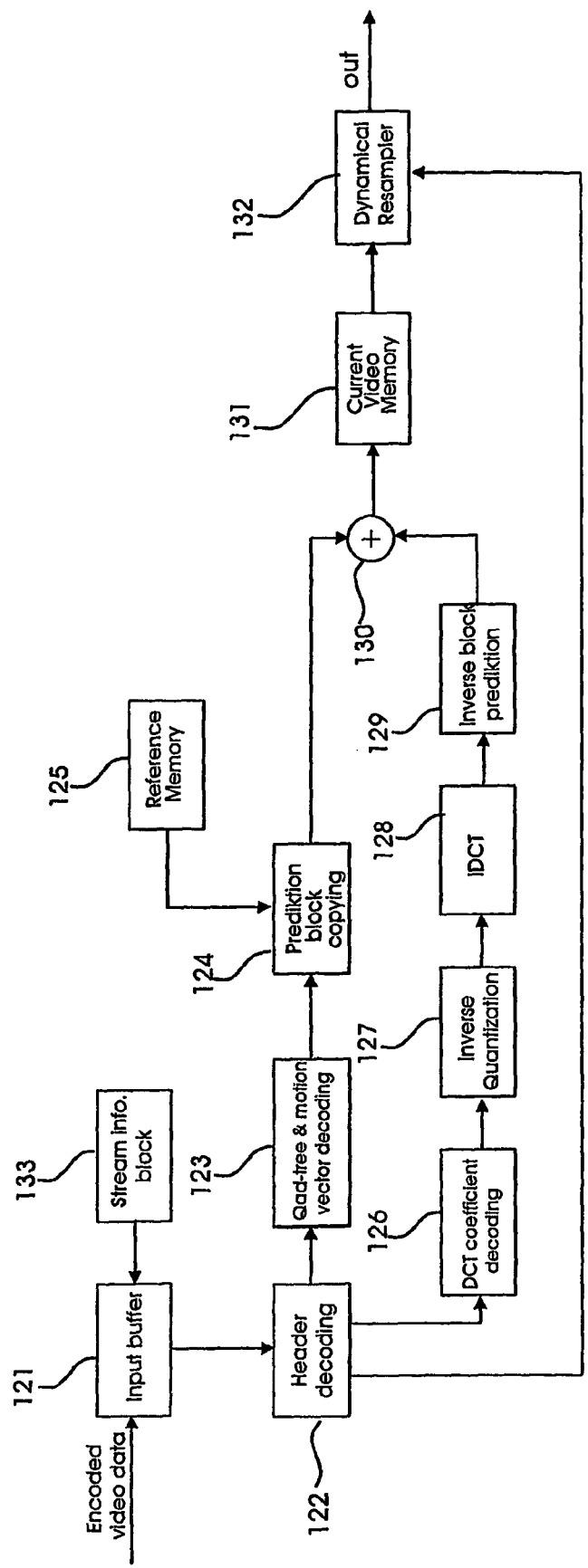
Figure 23:
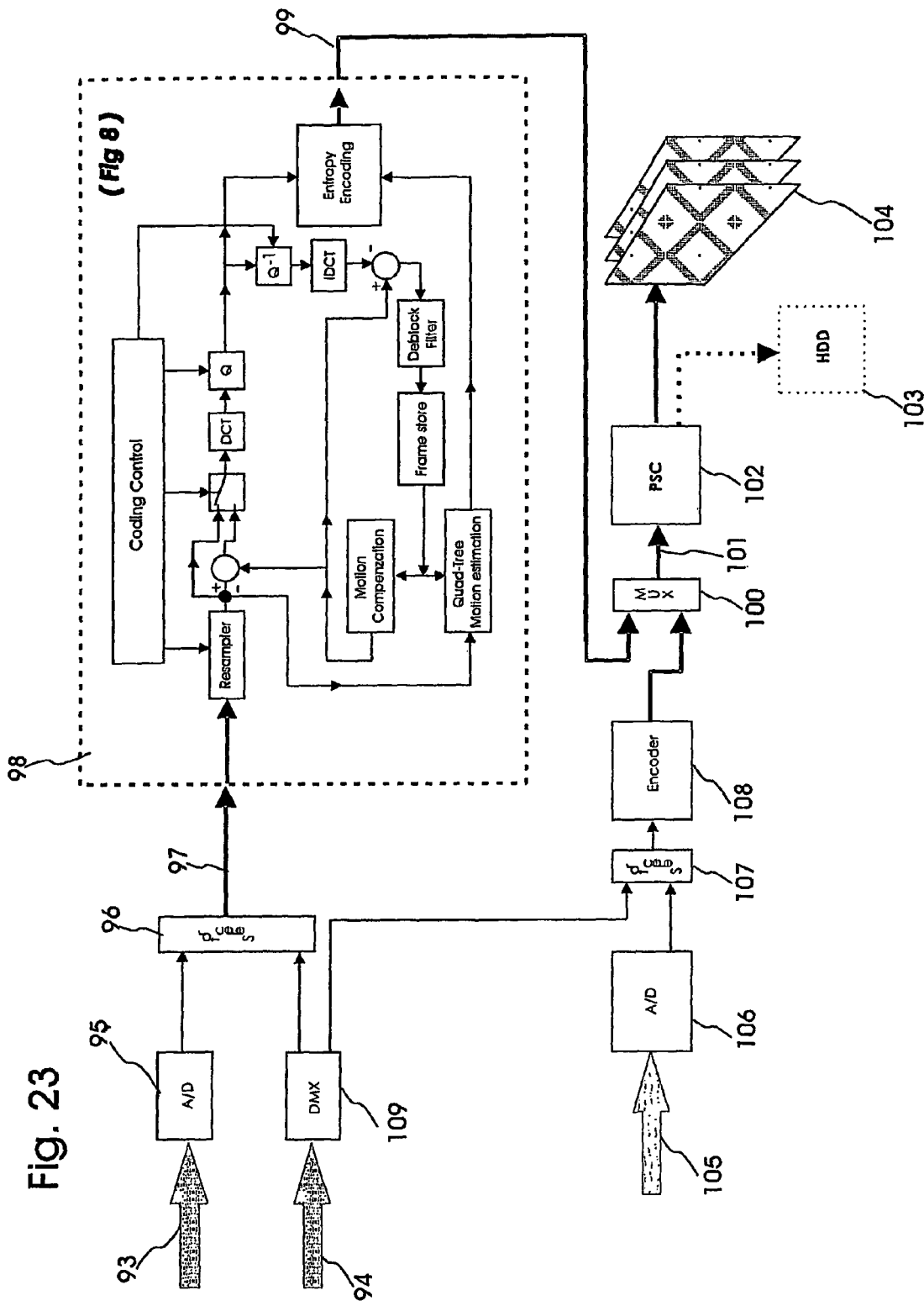
Figure 24:
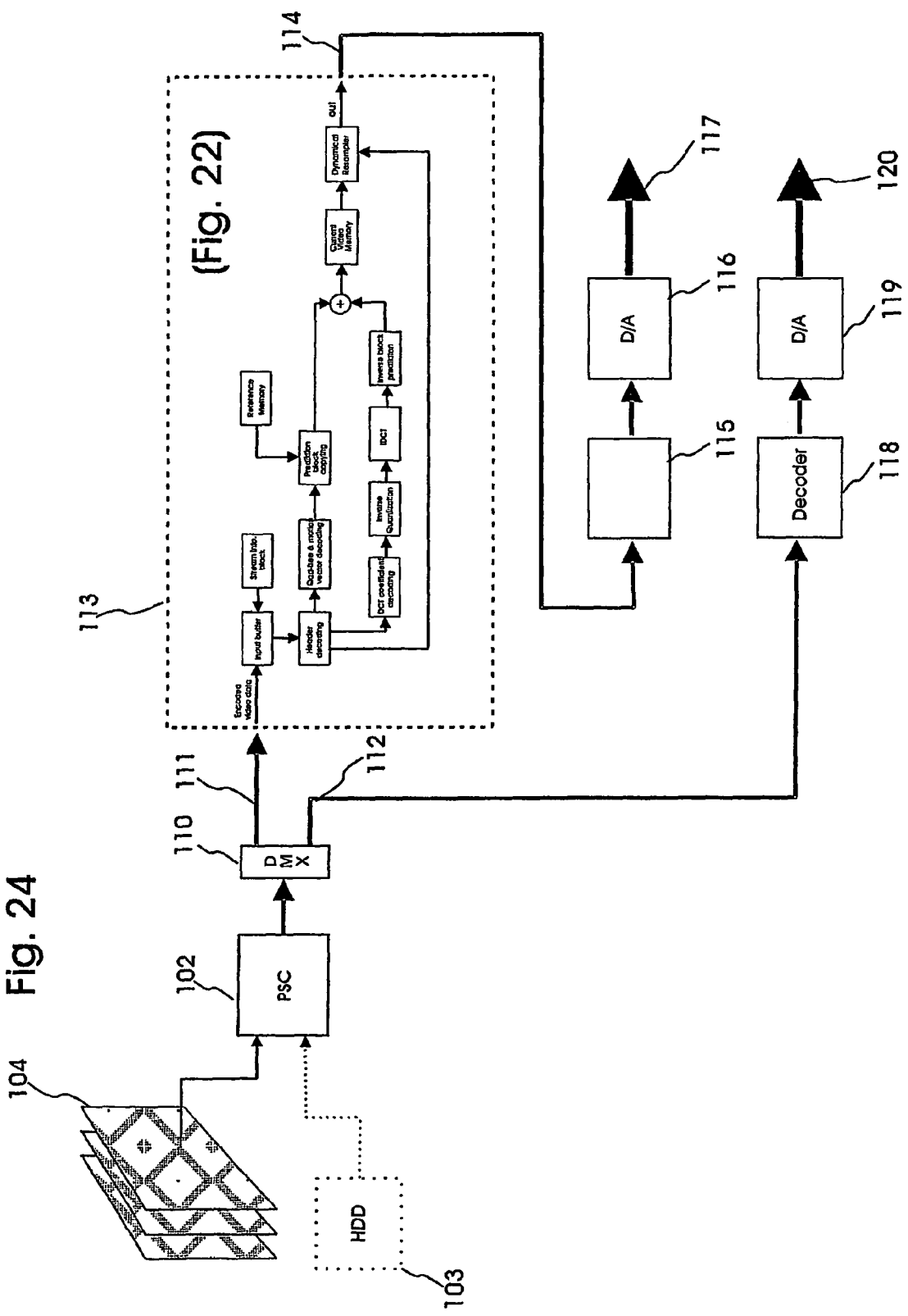

FIG. 18c shows the schematic diagram of the neural network applicable for another embodiment of the neural bandwidth control system according to the invention, FIG. 19 shows the modification of the data path of the input data in the high dynamic-range neural bandwidth control system, FIG. 20 illustrates the dynamic scaling method according to the invention, FIG. 21 shows the signal/noise characteristics of the transmission realized during the inventive dynamic scaling method, compared to the characteristics without dynamic scaling, FIG. 22 is the flowchart of the decoding process for video data coded with the method according to the invention, FIG. 23 is the schematic block diagram of an audio and video data coding system applying the method according to the invention, FIG. 24 is the schematic block diagram of a system applicable for decoding audio and video data coded according to the invention.

III.

The logical structure (schematic functional diagram) of the hybrid coding system according to the invention is shown in FIG. 8. Main functional units of the system are in many ways similar to the known MPEG coding system shown in FIG. 1. The input video data 60, in other words, the frames to be coded are fed into the frame scaling module 61, which, according to a number of different criteria (discussed below in detail), either reduces the size of the input frame or leaves it unchanged. The entire system is controlled by a coding control unit 62, with the exact functions thereof clarified later in the present description. Frames or blocks are coded according to intra or inter coding depending on intra/inter switch 63. Blocks are directed to the output 73 in a transformed, quantized and coded state, having passed through DCT transformation module 64, quantization module 65 and entropy encoding module 72. Reference frames needed for coding inter frames are generated by an inverse quantization module 66 and an inverse DCT module 67, from which the reconstructed reference frames are fed into the frame store 70 through a de-block filter 69. Motion compensation, i.e. production of filtered reference frames and compensated motion information 74 (motion vector and the subtracted block) is carried out by a module designated with the reference numeral 68 (with a resolution that is adjustable between ½, ¼, and ⅛ pixels). The frame store 70 stores the current reference frame, with the blocks thereof being automatically refreshed (actualized). The module 71 performs the identification of the changes, and finds that block partitioning which is best suited for tracking the changes in the frame, and the module 71 describes the best block partitioning using a Quad-tree structure (detailed below). The entropy encoding module 72 is a so called neural arithmetic compressor (see below).

In the following we explain in greater detail certain aspects of the encoding (compression) process according to the invention.

The term "prediction" is used in the present description in a sense that covers reversible mathematical expressions which, exploiting actual or potentially expectable similarities, are based on operations of a substantially averaging character, and return original values with a good approximation. This means that data reconstruction can only yield approximated values of the original data, in other words, expected values are "predicted". For practical purposes a specific function is used to perform these calculations (that usually involve averaging operations).

The inventive compression method has an essentially hybrid nature, because it exploits both temporal and spatial redundancy. The implemented compression is based on a hierarchical block structure containing blocks of dynamically varying sizes. The reference search uses not only the frames immediately preceding and following the current frame, but further preceding and subsequent frames as well, with a maximum depth of +1 and −3 frames (that is, reference search is allowed in one following and three preceding frames). High-level motion compensation is realized by the method, with a resolution ranging from ½ to ⅛ pixels. The entropy compressor performs optimized arithmetical coding based on multi-level prediction.

In the following, the term "intra prediction" means a reversible mathematical expression that, depending on values in one or more reference blocks, reduces or zeroes out pixel values of the current block to be coded.

For the sake of clarity, it has to be pointed out that in the present description references are made to two fundamentally different prediction principles:
1. The so called "intra prediction", applied for coding intra frames, and
2. The prediction used in neural entropy coding.

These are identified at the appropriate place.

IV. Fast Intra Prediction of the Blocks to be Coded

IV.1

Intra prediction is based on the observation that neighbouring blocks in a given frame often have similar properties, and therefore spatial correlations among neighbouring blocks can be used for reduction. Thus, the information content of selected blocks (the blocks to be coded) can be modified on the basis of the information content of predetermined pixels of a block or blocks adjacent to the selected block using the intra prediction procedure mentioned above. In a possible aspect, intra prediction is realized using the vertical lines 76 of the block located before the block to be coded or the horizontal lines 77 (that is, pixel values thereof) of the block located above said block, or both of them, as it is schematically depicted in FIG. 9. Let vertical line 76 be called B, and horizontal line 77, A.

Let us consider a concrete example: Let 221, 224, 230, 232 be elements of the last horizontal line 77 of the block located above the block to be coded.

Let the block to be coded be the following:

219, 223, 226, 232
219, 224, 224, 231
217, 220, 221, 229
214, 220, 221, 228

Now we subtract the horizontal line 77 from each horizontal line of the block to be coded. We obtain the predicted block:

2, 1, 4, 0
2, 0, 6, 1,
4, 4, 9, 3
7, 4, 9, 4

This example uses horizontal prediction. The advantage of the prediction is the bit reduction of the pixels, and, as the tendency of values increasing from left to the right that could be observed in horizontal line 77 proved to be the same in the case of the block to be coded, the entropy of the data to be coded has also improved. The distribution of the resulting values is: 2ב2", 2ב1", 2ב0", 4ב4", 2ב9", 1ב7", which shows higher symbol occurrence rate than the original block.

The more transformation/prediction types are defined, the better is the achievable entropy by applying one of them. Thus, in one practical embodiment of the proposed solution a modified (predicted) block is coded instead of the original block 75 to be coded. The predicted block is computed by subtracting line-by-line the neighbouring horizontal line 77 A or vertical line 76 B from horizontal or vertical lines of the block 75 to be coded, or by subtracting from original pixel values the average values of A and B, the calculation typically being performed with the formula (pixel-(A+B)/2, and thereby obtaining the so-called predicted block. This is a known solution per se, but we have recognized that the efficiency of intra coding can be significantly improved if we allow using blocks of different sizes, even mixing them at the same time, by which we usually obtain blocks that can be better compressed. However, the high number of calculations which must be performed renders this solution infeasible in itself. In the known methods, the final, best compressed predicted block is found by effectively performing the DCT transformation and entropy coding on the predicted block. Only thereafter it is established, to what degree a given predicted block can be compressed. However, the best compressed predicted block found in the previous step can be used only if the error of the reconstructed block (compared to the original one) is not too high. Consequently, to measure the error the inverse transformations must also be carried out. Altogether, very high computing capacity is required.

Thus, according to the invention, a compressibility analysis is performed on the block to be coded before carrying out the DCT transformation. Based on the compressibility analysis, the block is coded with DCT and entropy coding. In most cases, however, the compressibility analysis reveals that it is worth examining the compressibility of the block also by dividing the block to be coded into further sub-blocks. In this case, the compressibility of blocks associated to the various block partition variants is analyzed, and that partitioning is selected which promises the best potential results. Finally, after the block partitioning followed by the intra prediction, DCT transformation is carried out on the basis of the selected, potentially most favourable block partitioning.

IV.2.

This process is now described in more detail.

As it can be seen in FIG. 12, in the shown embodiment of the invention, the possible block sizes are 16×16, 8×8, and 4×4 pixels. The (intra) prediction of blocks with different sizes can be carried out in a plurality of ways. These are listed on the following pages.

IV.2.1 Prediction of 4×4 Blocks

Six types of prediction are defined.

1. DC Prediction

Let S0 be the prediction vector:
If exist A and B, then
$S0=\Sigma(Aj+Bj+4)/8$
or else, if only A exists
$S0=\Sigma(Aj+2)/4$
or else, if only B exists
$S0=\Sigma(Bj+2)/4$
Or else $S0=128$ Thus the predicted block is computed according to the formula $DCP(j,i)=IB(j,i)-S0$ where $j=0\ldots 3, i=0\ldots 3$ where IB is the block to be coded, and DCP is the predicted block.

2. Horizontal Prediction $DCP(j,i)=IB(j,i)-A(i)$ where $j=0\ldots 3, i=0\ldots 3$ 3. Vertical Prediction $DCP(j,i)=IB(j,i)-B(i)$ where $j=0\ldots 3, i=0\ldots 3$ 4. Diagonal Prediction Combined with Horizontal and Vertical $T(0,0)=(B(3)+2*B(2)+B(1)+2)/4$ $T(1,0)=(B(2)+2*B(1)+B(0)+2)/4$ $T(2,0)=(B(1)+2*B(0)+A(-1)+2)/4$ $T(3,0)=(B(0)+2*A(-1)+A(0)+2)/4$ $T(4,0)=(A(-1)+2*A(0)+A(1)+2)/4$ $T(5,0)=(A(0)+2*A(1)+A(2)+2)/4$ $T(6,0)=(A(1)+2*A(2)+A(3)+2)/4$ $DCP(j,i)=IB(j,i)-T(j-i+3)$ where $j=0\ldots 3, i=0\ldots 3$ 5. Diagonal with Vertical $T(j,i)=A(3)$ where $j=0\ldots 3, i=0\ldots 3$ $T(0,0)=(A(0)+A(1))/2$ $T(1,0)=A(1)$ $T(0,1)=T(2,0)=(A(1)+A(2))/2$ $T(1,1)=T(3,0)=A(2)$ $T(0,2)=T(2,1)=(A(2)+A(3))/2$ $DCP(j,i)=IB(j,i)-T(j,i)$ where $j=0\ldots 3, i=0\ldots 3$ 6. Diagonal with Horizontal $T(j,i)=B(3)$ where $j=0\ldots 3, i=0\ldots 3$ $T(0,0)=(B(0)+B(1))/2$ $T(0,1)=B(1)$ $T(1,0)=T(0,2)=(B(1)+B(2))/2$ $T(1,1)=T(0,3)=B(2)$ $T(2,0)=T(1,2)=(B(2)+B(3))/2$ $DCP(j,i)=IB(j,i)-T(j,i)$ where $j=0\ldots 3, i=0\ldots 3$ IV.2.2. Prediction of blocks with the size of 8×8 pixels can be implemented according to similar principles.

In this case, four possible prediction types are defined:
1, DC Prediction.
If exist A and B then
$S0=\Sigma(Aj+Bj+8)/16$
or else, if only A exists
$S0=\Sigma(Aj+4)/8$
or else, if only B exists
$S0=\Sigma(Bj+4)/8$
else $S0=128$ 2. Horizontal Prediction $DCP(j,i)=IB(j,i)-A(i)$ where $j=0\ldots 8, i=0\ldots 8$ 3. Vertical Prediction $DCP(j,i)=IB(j,i)-B(i)$ where $j=0\ldots 8, i=0\ldots 8$ 4. Diagonal Prediction $DCP(j,i)=IB(i,i)-(A(i)+B(i))/2$ where $j=0\ldots 8, i=0\ldots 8$ IV.2.3. Finally, prediction of 16×16-pixel blocks is also similar:

In this case four prediction types are defined.
1. DC Prediction.
If exist A and B then
$S0=\Sigma(Aj+Bj+16)/32$
or else if only A exists S0=Σ(Aj+8)/16
or else if only B exists
S0=Σ(Bj+8)/16
else S0=128

$DCP(j,i)=IB(j,i)-S0$ where $j=0\ldots 15, i=0\ldots 15$ (IB is the current block, DCP is the predicted block)

2. Horizontal Prediction $DCP(j,i)=IB(j,i)-A(i)$ where $j=0\ldots 15, i=0\ldots 15$ 3. Vertical Prediction $DCP(j,i)\ IB(j,i)-B(i)$ where $j=0\ldots 15, i=0\ldots 15$ 4. The So Called "Plan Prediction"
v=5*((Σ((A(j+7)−A(j−7))*j))/4)/4
h=5*((Σ((B(j+7)−B(j−7))*j))/4)/4
k=A(15)+B(15)
T(j,i)=(k+(i−7)*h+(j−7)*v+16)/32

$DCP(j,i)=IB(j,i)-T(i)$ where $j=0\ldots 15, i=0\ldots 15$

IV.2.4. So, in this aspect the proposed method uses three different block sizes and as many as 14 prediction types. It is easy to see that high computing capacity would be required if the known method were applied, as all the predictions and subsequent calculations should be carried out 4 times in 16×16-mode (that is, in case the allowed block size is 16×16), also 4 times in 8×8-mode, and 16 times in 4×4-mode.

In practice, this means that if the 16×16-sized block has not been divided into sub-blocks, the P→DCT→Q→IQ→IDCT→IP transformation sequence, and the subsequent entropy coding of coefficients, and determining MSE values for original and inverse transformed blocks must be performed 4 times. If the division of blocks into sub-blocks is allowed, according to the method described above, the total number of transformations increases to 16 (4*4) or even to 96 (6*16) (although with smaller block sizes).

For this reason, the selection of the best predicted block is performed according to the flowchart presented in FIG. 10. Block data 79 pass through multiplexer/selector 80, which, depending upon the block size, selects the current prediction mode 81 out of those above enumerated. Selector 82b can be set by the user to direct block data 79 of the predicted block into processing module 82c either directly or through a Hadamard transform module 82a. The processing module 82c produces the absolute squared sum of the block, with comparator 83 evaluating the resulting sum. In case the value is smaller than a reference threshold value, said reference threshold is overwritten by the momentary sum, with the current prediction mode being stored together with the predicted block by processing module 84. In the following the multiplexer/selector 80 selects the mode for the next prediction, and the whole process is repeated until all available modes—in other words, prediction modes pertaining to different potential partitionings of the block—are tested. At the end the best predicted block, and also the prediction mode by which it was generated, is determined.

The predicted block is summed by processing module 82c using the following formula:

$$sum_{(i)} = \sum_{i=0}^{M} abs(pixel_{(i)})^2 \quad \text{(Equation I)}$$

where M is the block length.

In certain cases it could prove disadvantageous that the above method does not take into account spatial frequencies. That is the reason for including Hadamard transformation module 82a. The transformation is carried out before the squared sum is computed, and the user can decide to apply it or not. The definition of Hadamard transform is given below. This transformation is similar to the DCT in the sense that it generates frequency components/coefficients of the transformed block. In most cases, a more efficient prediction will be the result, where the transformed block contains fewer frequency components/coefficients.

After the best block partitioning and the corresponding prediction mode has been determined as described above, the remaining transformations (DCT . . . ) are carried out and the block is coded with the entropy coding module.

Having compared the inventive method to the known solution it turned out that the quality/compression ratio of our method is cca. 1 dB better. Though better compression could be achieved with the known method, it was always at the expense of quality. The inventive method, however, provides better image quality and practically the same efficiency of compression.

Another important feature of the inventive method is that the computational load thereof is approximately one-tenth that of the known methods, if Hadamard transformation is performed, and approximately 1/16 of the computational load required by known methods if Hadamard transform is not applied.

As the partitioning of blocks must somehow be recorded for successful decoding, blocks are partitioned according to a so-called Quad-tree structure. Each block of 16×16 pixels can be conceived as a root with four descendant leaves, which in turn can be further decomposed into four other descendants down to the block size of 4×4. This is illustrated in FIG. 11, where in one of the 4×4-pixel sub-blocks (03) of the given block further 2×2-pixel sub-blocks are shown and in one of these 2×2-pixel blocks individual pixels are shown. The graph beside the image of the block illustrates how individual sub-blocks, or even individual pixels of the block can be identified if needed. It can be clearly seen that as the resolution increases, the amount of data needed for describing the given partitioning also increases.

This partitioning method (allowing three different block sizes) is proposed as a default for the inventive method. In another implementation, however, this can be overridden by the user or the system itself and a mode that uses only two different block sizes can be set. This will expediently pertain to the whole frame, and cannot be mixed with the three block size-mode, preventing that one block in a given frame is coded in two-block mode and another in three-block mode.

The intrapredictive coding in one proposed aspect of the invention allows for 3 possible modes using dynamically changing block sizes (I-type). Thus, during the coding of an entire I-frame it is allowed to apply blocks of different sizes (applicable block sizes are listed below). It should be noted again that the chosen mode must be indicated in the header structure of the frame. The 4 possible modes in this example are the following:

Coding using three different, dynamically changing block sizes (16×16,8×8,4×4).
Coding using two dynamically changing block sizes (16× 16 and 8×8).
Coding using two dynamically changing block sizes (16× 16 and 4×4).
Coding using two dynamically changing block sizes (8×8 and 4×4).

In one implementation of the method, the user can only select between two- and three- block modes, or, optionally the system may automatically select the optimal mode. Accordingly, the user may choose from the following options:
1. Coding using three different, dynamically changing block sizes.
2. Coding two dynamically changing block sizes.
3. Automatically choosing one of the above options.
   The choice is usually determined by the available computational capacity, or, optionally, is based on evaluating certain characteristics of the frames to be coded.

FIG. 12 illustrates the block sizes used in the example described above.

Let us discuss now the process of intrapredictive coding with dynamically changing block sizes in more detail.

IV.3. Intrapredictive Coding Using Three Different, Dynamically Changing Block Sizes (I Type)

The size of the Y block is 16×16, or alternatively, four 8×8-pixel sub-blocks or sixteen 4×4-pixel sub-blocks are used.

The size of the UV is either 8×8 or, corresponding to the partitioning of the Y block, either four 4×4-pixel sub-blocks or sixteen 2×2-pixel sub-blocks are applied (see FIG. 13). It has to be noted that the block size of 2×2 pixels on the UV colour surface is allowed only in "inter" mode.

Because three different block sizes are applied, a method is needed for selecting the optimal size. size.

If we were to proceed according to the known method, we would have to carry out all necessary transformations using the largest block size, and measure the error between the original and the reconstructed block. Then, in case the error exceeded a limit, the block would be divided into four parts, and the transformations and error comparison repeated with each sub-block. Those sub-blocks that had an error above a given threshold value would again be divided into four sub-blocks and the transformations would be repeated again.

Though this method would be ideal, it would involve a number of transformations that are unnecessary for producing the end result.

In case a block has to be divided into three 8×8 and four 4×4-pixel sub-blocks, one set of transformation should be carried out in both directions on a 16×16 block, four 8×8 transformation sets also in both directions, and four 4×4 transformation sets should also be performed. Of these, the transformation set carried out on the 16×16 block and the set of transformations (DCT and entropy coding-decoding) performed on one of the 8×8 blocks are redundant. Thus, precisely those transformation sets would have to be carried out unnecessarily that have the highest computational load.

So, according to the invention first compressibility analysis is performed on the blocks. In one aspect of the invention this is carried out by dividing the block into four sub-blocks and computing the so-called variance for the block using the following formula:

$$\text{variance} = \frac{\sum_{j=0}^{M} pixel_j^2 - \left(\sum_{j=0}^{M} pixel_j\right)^2}{M} \quad \text{(Equation II)}$$

where M is the length of the sub-blocks, and by examining if the conditions variance≦TH8 or variance≦TH16 are fulfilled, where
TH8=the variance threshold allowed for 8×8 blocks
TH16=the variance threshold allowed for 16×16 blocks.

TH8 and TH16 are empirical constants. As the formula shows, the "variance" value quantifies the amount of visual details in the block.

Upon the user's choice, the Hadamard transform can be activated before the calculation, but the TH constants will be different from those used for the calculation without the Hadamard transform.

If the variance values for all sub-blocks remain within a limit of ±N %, and the sum of said variance values does not exceed the preset threshold TH16, the block can be coded using the largest block size.

If the above condition is not fulfilled, but the variance of a sub-block is smaller than TH8, the given sub-block can be coded in 8×8-size. Otherwise, the 8×8-pixel sub-block should be further divided into 4×4-pixel sub-blocks.

The error caused by quantization should be taken into account when determining values for TH8/16 because, if the quantization error is relatively low, larger block sizes can be utilized with satisfactory results and the subdivision of blocks may become unnecessary.

TH values may, for instance, be determined using the following expression:

$$TH_{(i)} = \text{Thbasevalue}_{(i)} * \text{errorfactor}_{(qp)} \text{ where } i=0\ldots1 \text{ and } qp=1\ldots MAXQP$$

The value errorfactor(qp) is taken from a table indexed by qp that is determined on the basis of the quantization factor QP. Said quantization factor QP is provided in this case by the inventive neural control system as will be described in due course, but, alternatively QP can also be constant or be determined utilizing another known method.

The table of error factors contains values generated from combined quantization error values, with the error factor values decreasing toward greater indices.

In other words, higher quantization means smaller changes in TH and stricter conditions, or, put in yet another way, higher amount of visual details in a block and higher quantization causes the block size to converge toward smaller block size values.

Because, as it is explained below, coding of the block partitioning itself requires relatively high amount of data, it could be expedient to examine if it is worth to allow using three different block sizes. In case only two different block sizes are allowed, much less additional information has to be coded for recording block partitioning data.

So, in one aspect of the invention the block partitioning is analysed over the entire frame, assigning a statistical quantity to each block size (that is, the count of blocks with every allowed block size is determined). If each occurrence rates for all block sizes are approximately the same and we are in the three-block or automatic-choice mode, the process is continued. Otherwise, if most blocks are of one of two dominant block sizes, these dominant sizes are determined, and the method is carried on with steps described in the chapter entitled Intrapredictive coding using two dynamically changing block sizes (Chapter IV.4. below).

The method operates in two parts.

First, compressibility analysis is performed over the entire frame on the basis of variance calculations, with the optimal block partitioning being determined as a result. In the second part, the block partitioning is carried out with those predictions that were found for the optimal partitioning being performed, and finally the coding and the inverse transformations are carried out on each block belonging to the selected block partitioning, utilizing those predictions which proved to be the best.

Although the variance analysis exactly specifies how individual sub-blocks of a given block should be partitioned, this partitioning must be somehow recorded. The most obvious solution applies the so-called Quad-tree structure (illustrated in FIG. 11).

For the description of an entire block two variable levels are needed. The variable at the first level is called L, while second-level variables are designated with the letters ABCD. In case the given block is not partitioned, L is set to 0 (L=0 if the block size is 16×16). If the block is partitioned, L is set to 1. In this case four other bits are needed for describing the sub-blocks.

If a sub-block is not partitioned further (has a size of 8×8 pixels), the value of the associated bit is 0. In case the sub-block is further partitioned (into 4×4-pixel sub-blocks), the value of the associated bit is 1. For example:

L ABCD 0 the block is not partitioned.

1 0000 the block is divided into four 8×8 sub-blocks 1 0001 the first quarter of the block is divided into 4×4-pixel sub-blocks, the size of the other blocks is 8×8

1 0010 the second quarter of the block is divided into 4×4-pixel sub-blocks, with the others sized 8×8

If the block is partitioned (L=1), there are 16 possible combinations; so in this case the data encoding the partitioning of the block are 5-bit long together with L, while the partitioning data is only 1-bit long (L only) if the block is not partitioned.

After block partitioning has been completed, transformations pertaining to individual blocks are carried out and the transformed blocks are coded in the entropy coding module.

IV.4. Intrapredictive Coding Using Two Dynamically Changing Block Sizes

If the analysis decides in favour of the option that uses two block sizes, then the two dominant block sizes have already been determined. (Possible sub-block configurations are shown in FIG. 14.) Coding with two block sizes is performed in essentially the same way that we have described above, with only a few minor adjustments.

In case one of the dominant block sizes is 16×16 (the other size being 8×8 or 4×4) then, provided the variance does not exceed the limit TH16 (that is, the block flfils the condition in 16×16-size), the block will be coded with a size of 16×16, otherwise it will be divided before coding into 8×8 or 4×4-pixel sub-blocks. If, however, the two dominant block sizes are 8×8 and 4×4, the block will be coded with a size of 8×8 in case the variance values of at least three sub-blocks are smaller than TH8 (that is, the block fulfils the condition), and with a size of 4×4-pixels otherwise.

The advantage of a block partitioning where only two block sizes are allowed is that the 5-bit QT code (the partitioning descriptor) can be replaced by a single-bit code standing for the chosen partitioning (e.g., with a basic block size of 16x16, 0 may stand for a 16×16-block, 1 for four 8×8-sized sub-blocks).

All the subsequent transformations are the same as those already described. To sum up: the analysis chooses two block sizes for the frame, and these will be used for coding the entire frame.

Parts 1, 2, 3 of FIG. 14 illustrate possible sub-block combinations.

Thus, the block coding process proceeds as follows:

1. Dividing blocks into sub-blocks according to the block partitioning considered the best by the compressibility analysis
2. Determining the best predicted sub-block for each sub-block, and coding the predicted block.

IV.5. Transformations from Spatial Representation into Frequency Representation

IV.5.1 The discrete cosine transform (DCT) is not new in itself. The basic principles are identical for all block sizes.

The Discrete Cosine Transform:

$$y(k) = c(k) \sum_{n=0}^{N-1} \cos\frac{2\pi k(2n+1)}{4N} x(n)$$

where N is the number of elements in the given block, $c(0) = 1/\sqrt{N}$ and $c(k) = \sqrt{(2/N)}$, $1 \leq k \leq N-1$, with x(n) being the n-th element of the block to be coded.

Inverse CDT Transformation $$x(n) = \sum_{k=0}^{N-1} \cos\frac{2\pi k(2n+1)}{4N} c(k)y(k)$$

These transformations can be implemented as a factorized matrix-vector product, which significantly reduces the amount of calculations.

Currently implemented methods are realized with integer-based 2D transformations. As there exist several well-documented methods for performing DCT transformations on a computer, there is no need to address them here.

IV.5.2 Hadamard transform:

$$X(b) = \left(\frac{1}{2}\right)^{n/2} * \sum_{a=0}^{N-1} X(a)(-1)^{\sum_{k=0}^{n-1} a(k)b(k)}$$

where $a \leftrightarrow a(n-1)\ldots a(1)a(0)$ $b \leftrightarrow b(n-1)\ldots b(1)b(0)$ $a(k), b(k) = 0, 1$ Similarly to the discrete cosine transform, the Hadamard transform is a variant of FFT, with the great advantage that it comprises only addition and subtraction in matrix form. Thus, it can be performed much faster on a computer than DCT or FFT. It also has an important disadvantage, namely that the function is not continuous. That is why the Hadamard transform causes a visually more conspicuous error with higher-detail blocks than DCT. This makes it suitable to be directly applied only on "flat" (lower-detail) 16×16 blocks. As the 16×16-pixel block size requires the highest amount of calculation, it is preferable to apply Hadamard transform on 16×16 blocks whenever they need to be transformed. It should be noted here that in a specific embodiment the variance analysis performed according to the invention only allows the application of the 16×16 block size, if the given block has sufficiently low detail levels.

IV.6 The step performed between the DCT transformation of blocks or sub-blocks and entropy coding is the so-called quantization, during which matrix elements of the DCT-transformed block are modified according to specific guidelines in order to provide for easier coding with the entropy coding module.

The method applied according to the invention is similar to the standard MPEG quantization, and is performed using the following formula:

$$qcoeff_{(j)} = \left( \frac{(data_{(j)} * 16) + (matrix_{(j)} * 0.5)}{matrix_{(j)}} * \left( \frac{2^{17}}{QP * 2} + 1 \right) \right) / 2^{17}$$

where qcoeff(j) is the j-th element of the matrix corresponding to the DCT-transformed block after quantization,
data(j) is the j-th element of the matrix corresponding to the a DCT-transformed block prior to quantization,
matrix(j) is the j-th element of the quantization matrix,
and QP is the quantization factor (a scalar value).
The inverse quantization:

$$data_{(j)} = \frac{(qcoeff_{(j)} * 2 + 1) * matrix_{(j)} * QP}{16}$$

The quantization matrix matrix(j) has the same size as the DCT-transformed block, or the original block itself (e.g. 16×16, 8×8, etc.)

The solution provided by the inventive method differs from the known MPEG quantization method in that it chooses the quantization matrix $matrix_{(j)}$ depending on the quantization factor. Known MPEG quantization uses a single $matrix_{(j)}$ quantization matrix.)

The correspondence between the quantization matrix and the QP quantization factor is implemented by dividing the entire quantization domain into N subdomains with a previously specified bandwidth range being assigned to each subdomain. In an embodiment of the invention QP was between 1 and 36, the interval being divided into multiple (in one aspect, four) subdomains according to the following: (1-4), (4-8),(8-20),(20-36). Bandwidth ranges assigned to these subdomains were: (6000-1000 kBit/s, 800-1000 kBit/s, 400-800 kBit/s, 100-400 kBit/s)

That means that an optimised 4×3 matrix table (corresponding to the three different block sizes) was assigned to the divided QP domain, with individual elements of the table being entire $matrix_{(j)}$ quantization matrices.

As the size of $matrix_{(j)}$ is the same as the block size (4×4, 8×8,16×16), separate matrices are assigned to each of these block sizes and that way each row of the table comprises three cells (in other words, three matrices are assigned to each subdomain).

Thus, in case the method modifies QP, the optimal table row (optimal matrices) that corresponds to the given bandwidth, is assigned to the new quantization factor.

IV.6. Coding the Quantized Coefficients

In a concrete realization of the inventive compression system, three different methods have been implemented for coding the coefficients. Though the basic principles of these methods are known, they are briefly explained below for the sake of clarity.

IV.6.1. Coding Method Based on the Differences of DC Values of the Discrete Cosine Transform As it turns out from the name, this method comprises the steps of subtracting DC values of consecutive blocks from each other and coding the resulting differences by an arithmetic coding method (the principles of arithmetic coding are well-known and are detailed later in this document).

$$X_{dpcm} = X_{(i)} - X_{(i-1)}$$

The method is also called delta pulse code modulation (DPCM), and is based on the observation that the difference between consecutive DC values is usually very small, so the difference can be coded with fewer bits than the values themselves. Because the inventive method utilizes multiple block sizes, it is important to note that only the DC values of blocks of the same size can be expediently subtracted from each other, as the block size determines the magnitude of DC coefficients.

The arithmetic method codes each block size with dedicated parameters (subdivision of the coding interval, upper/lower limits of coding interval, etc.).

IV.6.2 Run-Length Coding of AC Values and Arithmetic Coding of the Resulting Compressed Values AC coefficients are retrieved by means of the so-called "zig-zag" table (see FIG. 4, 37) and are compressed by the known run-length method.

The run-length method generates ordered pairs (coefficient: occurrence count), where the latter value specifies the number of occurrences of the given coefficient in the data sequence. Because the total number of pairs in a given block cannot be foreseen, either the number of pairs should be specified or an end-of-block code should be inserted after the last pair.

If the coefficient value of the last pair is zero, said last pair need not be coded—it is sufficient to write the end-of-block code into the sequence. The coefficient-occurrence count pairs are written in reverse order (occurrence count:coefficient) into the data sequence to be coded. The reason is that in this manner the zero value of the occurrence count parameter can be used as an end-of-block code (without, of course, the corresponding coefficient) because, if all pairs are valid ones, no combination can occur where the occurrence count is zero, so the code can be safely applied as end-of-block code.

If the block contained only zeroes prior to coding, only the end-;of-block code is coded. In this case the given block will be zeroed out (filled with zeroes) before decoding during block reconstruction. Pairs produced by the run-length method are finally also coded with arithmetic coding.

IV.6.3. Arithmetic Coding of AC Values Using Conventional Parameters and Parameters Predicted by Means of a Neural Network In this method, AC coefficients are directly coded with the arithmetic method, without intermediate run-length coding. In one of the methods implemented in the coder according to the invention, arithmetic coding is performed such that the level at which the current coefficient is coded is determined by the value of the previously coded coefficient through a modulo function (this is in many ways similar to conventional arithmetic coding without a neural network). This modulo function usually ensures only that in case more than one identical AC coefficients are beside each another, the coefficients are coded at the same level. The operating principles of the neural arithmetic coding module are explained in detail later in this document. Suffice it to mention here that in the inventive neural arithmetic coder there are no parameters (interval limits, interval subdivision) which would depend on the AC values. No end-of-block code is used, instead, the position of the last non-zero AC coefficient in the transformed and quantized block is recorded by putting out the actual position plus one. This is needed because if all AC coefficients would be zero in a block, it is possible to indicate, by writing out a zero, that no further data associated to the given block are coded in the output data stream (in other words, that the block contains only zeroes).

For example:
positions 0 1 2 3 4 5 6 7
coefficients: 63 11 21 32 0 0 0 0
output: 3 63 11 21 32
where 3 indicates the last active (non-zero) position. This arrangement, however, is incapable of indicating the situation where all data are zeroes, because if a 1 is found at position 0, we should still code a 0 for the last active (non-zero) position. So, the position value is increased by one except when all data are zeroes.

So the output data sequence will be the following: 4 63 11 21 32, or, if everything is zero, only 0.

As an alternative to the above method, it could be conceived that a zero is coded for each coefficient at a predetermined level, and a one if the last non-zero value has been reached.

For instance:
Level 0: 0001 where the "1" indicates the last non-zero data
Level 1: 63 11 21 32)

In the coding module implemented according to the invention one of the two above described methods are applied for preparing AC data for entropy coding. However, without departing from the scope of the invention, other transformations can also be utilized.

IV.6.4. During entropy coding both method 2 (see Chapter IV.6.2) and method 3 (see Chapter IV.6.3) are executed in test mode, and finally that method is applied which resulted in a shorter data sequence. Of course, the chosen method must be identified somehow in the coded data stream.

Method 1 (for coding DC coefficients) is always carried out, with coded data being output into the output data stream and subsequently being coded with the neural entropy coding module according to the invention. Of course, other known entropy coding methods can also be utilized.

For the sake of clarity, let us consider the format of the output data stream (before it would enter the arithmetic coder) for a single sub-block, utilizing methods 2 and 3 (Chapters IV.6.2 and IV.6.2, respectively)
2. |0|PRED|DPCM|AC|EOB or if everything is zero then |0|PRED|DPCM|EOB
3. |1|PRFD|DPCM|POS|AC or if everything is zero then |PRFD|DPCM|EOB
where
the starting bit identifies the coding mode
PRED prediction type
DPCM DC coefficient coded by delta coding
AC one or more AC coefficients
POS position of AC coefficient
EOB end-of-block character.
Format for coding the whole 16×16 block:
|QT=0000|[0|PRED|DPCM|AC|EOB],
  [0|PRED|DPCM|AC|EOB],
  [0|PRED|DPCM|AC|EOB],[0|PRED|DPCM|AC|EOB]
where QT (quad tree) are data describing block partitioning in case the block has been divided into four sub-blocks and each sub-block applies type-2 coding
Or:
|QT=0001|
[0|PRED|DPCM|AC|EOB], |[0|PRED|DPCM|AC|EOB] (2×4×4)
[0|PRED|DPCM|AC|EOB], |[0|PRED|DPCM|AC|EOB] (2×4×4)
[0|PRED|DPCM|AC|EOB], (1×8×8)
[0|PRED|DPCM|AC|EOB],[0|PRED|DPCM|AC|EOB] (2×8×8)
meaning that the 16×16 block contains three 8×8 sub-blocks that are not subdivided, and the fourth 8×8 block (coming in fact first) has been subdivided into four 4×4 sub-blocks.

IV.7. Intrapredictive Coding of the UV Colour Surfaces

During the known method of MPEG coding, pixel data of a given frame are converted from RGB to the so-called YUV2 format. Here Y stands for the lightness (luma) signal, while UV is the colour difference (chroma) signal.

The physical size of UV surfaces is scaled back to half relative to Y (though this causes data loss, this loss has proved to be acceptable and does not lead to a significant decrease in quality).

Thus, to each 16×16 Y block, one 8×8 U and one 8×8 V block is assigned (this is illustrated in FIG. 12).

In this manner, when partitioning U and V blocks into sub-blocks, only the 8×8 and 4×4 sizes are desirable for use (as 2×2-pixel sub-blocks do not compress better than 4×4 or 8×8 ones, they are not worth using). The analysis of the block partitioning is done practically the same way as what has already been described, with the important difference that here comparison is performed only with the TH8 variance threshold. It has to be remembered that TH8 is an empirical value, with which the variance is compared, the latter computed in a way similar to Equation II. If the variance of the tested block satisfies condition TH8 $\geqq$ variance then the block is coded with 8×8-size, otherwise with a size of 4×4 pixels.

For the prediction of U and V blocks only DC prediction is utilized (it is empirically shown that the gain from using other prediction modes would be marginal).

Other transformations are the same as described above. The only difference is in the quantization step size (order of quantization).

The output format of the data block (prior to arithmetic coding) is the following:
|0|M|DPCM|AC|EOB or if everything is zero then |0|M|DPCM|EOB
|1|M|DPCM|POS|AC or if everything is zero then |1|M|DPCM|EOB
where M is the bit indicating block partitioning. E.g. M=0 if the block is not partitioned, M=1 if it is partitioned.

Let us now turn to the coding of so-called "inter" blocks, where a reference block is searched for the block to be coded in another frame.

V. Interpredictive Coding Using Dynamically Changing Block Sizes

V.1 As it has already been pointed out, coding of inter frames is based on temporal redundancy. This means that the current frame is compared with the previous or the subsequent frame, and only the differences between the two frames are coded. Reference search modes of the method are illustrated in FIG. 15. The following alternatives are possible: Searching only in the three preceding P-type frames (FIG. 15a); searching only in the two preceding B-type frames (FIG. 15b); searching in preceding and subsequent motion compensated references (FIG. 15c, in this case B-type frames usually cannot be used as reference).

The fundamentals of the method are identical to known methods: a search is performed for the block to be coded in a search range specified within the reference frame, then the redundancy (the difference block) is coded together with the position of the reference block (or more exactly, the motion vector), and where the difference block is computed by subtracting individual pixels of the block to be coded from respective pixels of the block located at the position determined by the search.

Of the possible search methods the best results would be yielded by the so-called "full search". Such a search would, however, have enormous computational load, since it would involve the comparison of the 16×16 block with data in the search range starting from each pixel of the range, when searching for a matching block in all of the possible locations within the search range. Practically, with a search range of 32×32 pixels this would mean 1024*256=262144 additions and subtractions and operations for determining the absolute value of the differences, only for finding a matching 16×16 reference block. Because a frame of 720×576 pixels contains 1620 blocks (with 16×16 pixel size), the overall number of calculations would exceed 424 million. That is why for practical purposes the so-called "fast search" methods are usually applied instead of full search. "Fast search" methods apply few test points (typically less than 64), and have the disadvantage of being successful only if the displacements are small (typically smaller than 1-4 pixels), that is, motions in the video footage are slow.

In case of greater displacements the probability of a successful search decreases rapidly. Another disadvantage of fast search methods is that, even if the search appears successful, it cannot be made sure that the found position is the minimum point (the position of the optimal reference block) within the search range.

The search method implemented in our invention can practically be regarded as a "full-search", which in case of slow motions has only slightly higher computational load than genuine full-search methods. Even in case of faster motions (greater displacements), the computational load of the inventive method is only a fraction of the load required by the standard "full-search" method.

V.2. The search method implemented according to the invention is based on the so-called "spiral search", which is carried out in practice as follows.

V.2.1 A search range is specified in the reference frame. Coordinates of the centre of the search range are identical to coordinates of the centre of the search sample (the block to be coded).

In the next step the search sample, that is, the block 88 to be coded is divided into smaller sub-blocks (see FIG. 16). In one embodiment of the invention, good results have been produced using 4×2 sub-blocks. Now, variance values are computed for each sub-block, using an expression similar to Equation II. If there are at least two sub-blocks that have a variance greater than the variance values of all the other sub-blocks, the sum of their variance is greater than a pre-defined empirical constant THV22, and the two sub-blocks are not located adjacently (e.g. sub-blocks 88*b* and 88*c*), then only these sub-blocks of the 16×16 block 88 are tested during the search.

In case the condition THV22≦variance$_1$+variance$_2$ is not fulfilled (where variance$_1$ and variance$_2$ are the variance values of the two biggest-variance non-adjacent sub-blocks), then the above operation is repeated with the four biggest-variance non-adjacent sub-blocks, of which the combined variance is compared with another constant THV24 (this is illustrated by sub-blocks 89*a*, 89*b*, 89*c*, 89*d* of block 89).

If the condition for the variance of the four sub-blocks is still not true, sub-blocks are merged into 4×4 sub-blocks and the above operations are repeated with two sub-blocks with constant THV42, and, if necessary, with four sub-blocks with constant THV44 (see sub-blocks 90*a*, 90*b* of block 90), attempting to find in the latter case the four biggest-variance non-adjacent sub-blocks.

If the respective condition is not fulfilled in any of the above situations, the reference search is performed using five 4×4 sub-blocks located in the four corners and the centre of the 16×16 block (FIG. 16).

The constants THV specify the minimum variance that the combined variance of the sub-blocks should equal or exceed in each of the above situations.

The process detailed above can be intuitively summed up as attempting to find the most detailed sub-blocks in the 16×16 block, supposing that in case they have matching references in the search range, other sub-blocks that are less rich in detail will also have their appropriate references.

The centre of the spiral is specified in the reference frame at a position conforming to the position of the search sample, and then blocks around the specified point are tested in widening cycles with the reduced search sample, described above. The search range is scanned with the relative position of sub-blocks of the sample pattern kept constant.

V.2.2.

The test is performed according to the following formula:

$$MSE = \sum_{j=0}^{M} \text{abs}\,(A_{(j)} - B_{(j)})^2$$

where M is the block length.

MSE is the so called Mean Square Error. Every time the MSE value is found to be smaller than the current smallest calculated MSE, the new MSE value, together with the current position, is written into a temporary buffer, e.g. in a 64-element circular buffer. If the buffer is full, data are overwritten starting from the first element.

The search method is preferably fine-tuned by analyzing the obtained MSE value from other aspects as well. For instance, in case the search finds multiple positions that satisfy the conditions for a match (e.g. MSE is smaller than the maximum allowed error), and these positions are located in the same direction (on the same side) seen from the starting point, and further the error increases as the search is leaving the region of these positions, then the search can be aborted because it is highly probable that the search moves away from the optimum point.

At the end of the search, after every point has been tested or the search has been aborted, the circular buffer contains those positions that are probably the best candidates for a reference position. (Of the 1024 possible positions only a smaller number are stored, e.g. according to the above example, 64 positions.) Stored positions are then tested again but this time with the whole 16×16 block, and the position yielding the smallest error is determined.

V.2.3. Now, the SAD$_{16}$ values (Sum Absolute Difference, the index refers to the block size) computed from the coded block and the newly established reference block are compared with an empirical constant MAXSAD16. SAD is computed using the following formula:

$$SAD = \sum_{j=0}^{M} \text{abs}\,(A_{(j)} - B_{(j)})$$

where M is the block length, A and B stand for elements of the reference block and the block to be coded.

The constant MAXSAD16 specifies the maximum acceptable error of the reference matched to a 16×16 block. In case the error of the block found by the search is not acceptable, the reference search is repeated in the frame preceding or following the current frame (depending on frame type). If none of the reference frames give acceptable results, the one that yielded the smallest error is chosen. Now the block is partitioned into four 4×4 sub-blocks and SAD$_8$ values are computed and compared with the (empirical) constant MAXSAD8 for each sub-block.

Thereafter, positions contained in buffers associated to the reference frames are tested and the reference frame and position is selected where the most 8×8 sub-blocks yielded acceptable results (fulfilled the SAD$_8$≦MAXSAD8 condition).

For each sub-block with excessive error the search is repeated in a reduced search range using a block size of 8×8, starting from the position of the given sub-block. If the error still exceeds the limit, the sub-block found the best by the 8×8-search is subdivided into 4×3 sub-blocks, and the search is repeated on sub-blocks satisfying the condition $SAD_4 > MAXSAD4$.

If all the sub-blocks of a particular block had to be subdivided into 4×4 sub-blocks, then for this particular block the reference search can be repeated in all reference frames, in case it is unsuccessful in the current reference frame.

In case the errors of individual sub-blocks are still found excessive after the search has ended, blocks where the search was unsuccessful are marked. These are to be coded as intra blocks in subsequent steps of the method.

Searching in all reference frames means that, if the search stops with a satisfactory result in e.g. the second frame, then it is not continued in the third frame.

V.3. Processing Blocks in 16×16 Partition

If the reference search is unsuccessful in the current frame in case of a 16×16 block (no reference block is found), and the current frame is P-type, the search is repeated in the preceding P-type reference frames, with a maximum depth of 3 frames. If the search is successful, the number of the reference frame is recorded, and the search is finished. Otherwise, the method selects the frame with the smallest error, divides the block into four 8×8 sub-blocks, and continues the search with those sub-blocks where the error exceeds the limit. If the current frame is B-type, search is first performed in the following P frame, then in the three preceding P frames. If, in case of a B-type frame the search is unsuccessful in all reference frames, an averaged reference block is produced from the following frame and one of the preceding frames by interpolating the positions of the best reference block-candidates found in the following and in one of the preceding frames using the simple expression applied in the MPEG method. If the square error between the produced interpolated block and the original block should remain too large, the reference frame where the error was the smallest is selected, and the block is divided into four 8×8 sub-blocks.

V.4 Processing Blocks in 8×8 Partition

The processing of 8×8 blocks is almost identical with the processing of 16×16 blocks, with the difference that if the search is still unsuccessful at the end of processing, blocks are subdivided into sub-blocks of 4×4 pixels.

V.5 Processing Blocks in 4×4 Partition

The processing of 4×4 blocks is almost identical with the processing of 8×8 blocks, the sole difference being that in case the search is still unsuccessful, the erroneous block is marked an intra block.

V.6. Extended Search with ½, ¼ and ⅛-Pixel Resolution

After the processing of the block has ended with full pixel resolution, the search is carried on with ½, ¼ and ⅛-pixel resolution (search in filtered/interpolated reference). The sole exception is the interpolation mode of B-type frames where the ½, ¼ and ⅛-pixel resolution search must be performed before the interpolation. Because the search with ½, ¼ and ⅛-pixel resolution is not essentially different from known methods which have been described earlier in this document, the process is not explained here.

In the implemented method, a maximum of three reference frames are assigned to each frame. These are different only in their size and the filtering method by which they were created (see FIG. 17).

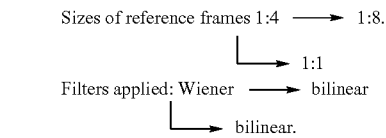

Each search process uses an associated reference frame. The search with ½ and ¼-pixel resolution uses the 1:4 ratio interpolated reference frame, while the ⅛-pixel resolution search utilizes the 1:8 ratio interpolated reference frame. The full-pixel search uses the 1:1 ratio interpolated reference frame. Because the application of interpolated reference frames and filters is known per se, it is not necessary to detail it here.

Similarly to previous situations, a spiral search is applied but here the number of test points is under 20 due to the significantly reduced search range. Usually, the search can only be aborted if SAD=0 (complete match between the current block and the reference block). The search can be performed with each block size, but only without block reduction (that is, only whole blocks and not sub-blocks are compared), which means that testing a 16×16 block involves 256 subtraction operations.

After the blocks to be coded have been subtracted from matched reference blocks, the resulting reduced blocks are transformed from spatial representation into frequency representation.

V.7.

After the process of finding the reference block for the entire 16×16 block and partitioning the reference block has been successfully completed, the block to be coded is also divided into equal sized sub-blocks, and the sub-blocks are subtracted from sub-blocks of the reference block. The differences are then subjected to discrete cosine transformation and quantization, and AC/DC prediction is applied on the coefficients contained in the resulting blocks. The prediction method, similarly to the prediction process of intra blocks, generates the differences between DC values of transformed blocks, and applies horizontal/vertical prediction on the first horizontal/vertical lines of AC coefficients. The difference between this method and the previous one is that the intra prediction described above subtracts the actual pixel values of neighbouring pixels from pixel values of the block to be coded, whereas in this case elements of the neighbouring DCT-transformed blocks are subtracted from elements of a DCT-transformed block. This method further improves coding efficiency of transformed blocks during entropy coding.

Decision about which prediction mode (horizontal or vertical) should be applied is made on the basis of the differences between DC coefficients of the blocks surrounding the transformed block, where the relative positioning of blocks may be the following:

C B
A X where X stands for the transformed block that is being processed, while A, B, and C are the surrounding blocks.

The prediction mode (pred) is selected by the following conditional expression:

$$pred = abs(A-C) < abs(C-B)$$

where A, B and C are DC coefficients of blocks surrounding the block that is being processed.

If the condition is true, vertical prediction will be applied, otherwise the horizontal mode is selected. Because the correlations determining the prediction mode are available when block reconstruction is performed, it is not necessary to record the selected mode in the output.

V.8.

In this section a possible data format and coding method is presented for data describing block partitioning.

The description of the block partitioning of the block to be coded is similar to what was presented in the section dealing with intra frames.

A maximum 2-bit long value, L describes the partitioning of a 16×16 block. Bit 1 is 0 if the block is not divided, and 1 if it is divided. Bit 2 has the value 1 if the block is labelled intra. This latter happens when each of the 8×8 sub-block are subdivided into 4×4 sub-blocks and more than 50% of these sub-blocks have been labelled as intra blocks. In that case the system will code the given block according to the process for coding intra blocks.

The data prior to entropy coding are the following:
RFIDX is the frame number of the applied reference frame
MV is the motion vector
DC is the first coefficient of the discrete cosine transform and AC designates the other DCT coefficients,
IP indicating the interpolation mode for B frames
I stands for intra mode
P is the number of intra mode prediction.
Modes for P Frames are the Following:
Mode 0: |L|RFIDX|MV|DC|AC
Modes 1 . . . 15: |L|QT|RFIDX|I|MV|DC|AC . . . I|MV|DC|AC
Modes for B Frames are the Following:
Mode0: |L|RFIDX|IP|MV|DC|AC
Modes 1 . . . 15: |L|QT|RFIDX|I|IP|MV|DC|AC . . . I|IP|MV|DC|AC
If I=1, the description of the given block changes to: |I|P|DC|AC.

Let us see two concrete examples for P-type frames:

| 1 | 0001 | 2 | | 1 | 0001 | 0 | |
|---|---|---|---|---|---|---|---|
| 0 MV4 DC4 AC4 | | | | 1 P DC4 AC4 | | | |
| 0 MV4 DC4 AC4 | | | | 0 MV4 DC4 AC4 | | | |
| 0 MV4 DC4 AC4 | | | | 0 MV4 DC4 AC4 | | | |
| 0 MV4 DC4 AC4 | | | | 0 MV4 DC4 AC4 | | | |
| 0 MV8 DC8 AC8 | | | | 0 MV8 DC8 AC8 | | | |
| 0 MV8 DC8 AC8 | | | | 0 MV8 DC8 AC8 | | | |
| 0 MV8 DC8 AC8 | | | | 0 MV8 DC8 AC8 | | | |
| four 4 × 4 blocks and three 8 × 8 blocks | | | | four 4 × 4 blocks, the first of which being an intra block three 8 × 8 blocks. | | | |

(Also in this case, the variables "AC" usually represent more than one data elements.)

Having coded the Y colour surface of the 16×16 block, the next step is coding the UV colour surfaces. The size of the block is in proportion with the size of the Y block and the sub-blocks thereof.

In case the Y block had the size of 16×16 pixels, then the UV block is sized 8×8 pixels, if the Y block is sized 8×8 then the UV block is sized 4×4 and finally, to a 4×4 Y block the corresponding UV blocks are sized 2×2.

Otherwise, the partitioning of U and V blocks is identical to the partitioning of the Y block. The method of partitioning of the UV blocks is performed in the same manner as the partitioning of the Y blocks. Thus during the coding process only the DC and AC values must be sequentially written out before entropy coding, because all the other data (block partitioning descriptors, block identifiers, etc.) are already described in the Y block.

V.9. Prediction of Macroblocks (Motion Vectors and Inter Blocks)

For the optimal coding of motion vectors (that is, vectors indicating motion relative to the reference block) the motion vectors are preferably represented in the shortest possible form. This can be provided by subtracting from the current motion vector the motion vector belonging to the block located beside, above, or diagonally above the current block. Of the three possible neighbouring motion vectors that one is selected which is the closest to the mean value, or in other words, is bigger than the smallest and smaller than the biggest.

V.10. Finally, data are coded using the entropy coding module. We will now turn our attention to the description of the inventive binary multi-level arithmetic coding module.

VI. The Neural Arithmetic Coding Module

The entropy coding module according to the invention utilizes binary adaptive technique. This means that input data are processed bit by bit, in the finction of the occurrence frequency and the pattern of bits already received.

VI.1. The primary design aim for the method was achieving the best possible compression with relatively simple calculations. The inventive method can be implemented without using divisions, performing only two multiplications and a few additions and logical operations. All other operations are based on integers.

The inventive method is a so-called arithmetic coding method. Arithmetic coding is a method known per se. The basic principle of arithmetic coding involves the modification of the upper and lower limits of an interval (range) depending on received data of the data sequence to be coded. Arithmetic coder is truly efficient only if the distribution of incoming data is known to some extent, in other words, if it the probability estimate for the value of the next input data element is known to some extent.

The following short algorithm performs arithmetic coding on a binary data stream (containing only 0 and 1 symbols). The current data to be coded (the next bit of the data stream) is stored in the "bit" variable. The upper and lower limits of the coding interval are the variables "area[0]" and "area[1]".

$$\text{area}[\text{inverz}(\text{bit})] = \text{area}[0] + \frac{(\text{area}[1] - \text{area}[0]) * \text{prob}}{2^{16}} + \text{bit}$$

```
if((area[1] − area[0]) < 256)
{
```

$$\text{outdata} = \frac{\text{area}[1]}{2^{24}}$$

```
area[0] = area[0] * 2^8
area[1] = area[1] * 2^8
}
prob = calc_next_probe(bit)
```

The key factor in increasing the efficiency of coding is how the value of the "prob" variable (in the following: probe value or probe) is determined. The probe value is returned in the above example by the "calc_next_probe(bit)" function.

The array "area[0,1]" contains two 32-bit values, namely the "area[0]" and "area[1]" variables that store the upper and lower limits of the coding interval. As it is known from the theory of arithmetic coding, the interval (area[0], area[1]) is scaled with the probe value. In known methods the probe value is usually determined as a function of the frequency of occurrence of previously arrived bits. Depending on the value of the newly received bit, either the lower or the upper limit of the coding interval is modified with the scaled value. The interval can be modified (new bits can be coded) until the difference of the upper and lower limits becomes smaller than 256. In principle, other values can also be used, but for treating the overflow, 256 appeared to be the most practical value. Accordingly, when the difference of the upper and lower limits becomes less than 256, the 8 most significant bits are written out to the output data sequence, and variables representing both the lower and upper limits are shifted to the left by 8 places.

This can be written in mathematical form as:

area[1]=area[1]*256 area[0]=area[0]*256

VI.2. The probe value is determined as follows:

We introduce the concept of frequency table, and define two functions for describing the occurrence rate of 0-s and 1-s in the incoming data sequence, f(0) and f(1). Received bits are fed into a buffer with the length of m bits, where: $2^m = N$, so the base-2 logarithm of N provides the window width.

Bits arriving sequentially into the buffer constitute the "window" variable (shifting left the contents of the buffer as needed). The "window" variable is truncated to a length of m bits to form an index (stored in the "index" variable) that points to one of the rows in the frequency table. In the example presented here the frequency table has 512 rows. Elements of the frequency table are specified by variables FreqTbl[index]f0 and FreqTbl[index]f1. These variables show how many times the received bit has been 0 or 1 when the bit combination was the same as the bit combination currently stored in the buffer (in other words, the current bit combination is considered as an index pointing to a given row of the table).

```
count = count + 1
if(count >= log₂ (N + 1)){
    count = 0
    window = 0
}
window = window * 2 + bit
FreqTbl[index].f0 = FreqTbl[index].f0 + (2 * bit)
FreqTbl[index].f1 = FreqTbl[index].f1 + (2 - (2 * bit))
index = window mod N
sum = FreqTbl[index].f0 + FreqTbl[index].f1 prob = FreqTbl[index].f0 * FracTbl[sum] / 2¹⁰ if(sum > 256){
    FreqTbl[index].f0 = FreqTbl[index].f0 / 2
    FreqTbl[index].f1 = FreqTbl[index].f1 / 2 + 1
}
```

At the beginning of the compression, all variables (except N, of which the base 2 logarithm gives the window length) are filled with zero. The incoming bit overwrites the least significant bit of the buffer (window), and that element of the frequency table which was addressed by the previous value of the buffer is updated according to the newly arrived bit. As it will soon become apparent, the emphasis is on the requirement that the previous value of the buffer should be associated with the bit arriving one step later, that is, the bit currently being processed. It is precisely this feature that makes it possible to "predict" the value of the incoming bit during the operation of the system. The previous value of the buffer is stored in the variable "index" for which N is an upper limit.

In the next step of the method, the probe value (the value of the "prob" variable) is calculated for the next bit. The exact formula for that should be $$prob = \frac{FreqTbl[index] \cdot f0}{sum}$$

but this expression is not applied directly because the result would be a fraction. The calculation (the division) would require real arithmetic that is too slow for our purposes.

Instead, a fraction table of 512 elements is used (represented by the "FracTbl[sum]" variable), of which the appropriate element is selected by the sum of bit frequencies in the corresponding row of the frequency table (cf. the "sum" variable in the above algorithm). To determine the probe value, the f0 value in the appropriate row of the frequency table is multiplied by the value retrieved above from the fraction table, and then the product is multiplied with a constant, e.g. the product is shifted 10 bits to the right. Thus, the probe value is obtained, which will fall into the interval 0 . . . 65535, which is in turn analogous with the interval 0 . . . 1. As the fraction table contains 512 elements (actually the appropriately scaled values of 1/sum, where the "sum" variable is used as an index to the table at the same time), it should be made sure that the "sum" value does not exceed this value.

This is achieved by testing the "sum" value and by re-scaling f0 and f1 if "sum" is greater than 256 (because in effect the value of the "prob" variable is determined by the proportion of f0 and f1 and not their absolute value, they can be re-scaled).

As it turns out from the algorithm, the method is fairly simple. Since divisors are powers of 2, divisions can be substituted by right-shift operations. The MOD operation can also be substituted by a logical AND.

VI.3. As it has already been mentioned, the method performs coding at different levels. In practice this affects only the probe variable. In other words, the same coding module can be used for all data types, only the parameters (N, window size, limits of the coding interval) should be adjusted. Different levels are assigned to each data type, with each level being divided into a plurality of sub-levels according to the requirements of the given data type. For instance, for coding the results of the 4×4 discrete cosine transform operation a specific type level is defined, with different sub-levels being assigned to the coding of AC and DC coefficients.

The constant N determines the window size, in other words the number of previously received bits that are tested together with the bit currently being received. This factor strongly affects coding efficiency, but also increases the required memory, because more memory is needed if N is increased.

The method presented above is a fast integer-arithmetic variety of known methods. With parameters tuned appropriately, compression efficiency is 10% higher than that of the VLC method used in MPEG systems. So far, only methods using far more complex probe algorithms have performed significantly better than that. To improve efficiency, the frequency table should also be significantly sized up. Both the chosen probe algorithm and frequency table size affect the execution time of the method.

The best known method for determining the probe value for data structures utilized in the present invention would be the so-called dynamic Markov model. This, however, works efficiently with a frequency table of at least 64 Kb. If all sub-levels applied for coding were set to this size (that is, if all variables and variable types corresponding to different block sizes were to be coded in this manner), more than 16 Mb of memory should be allocated for the frequency tables only.

These problems have made it necessary to devise a new, significantly more effective probe algorithm.

VI.4. Arithmetic Coder with Neural Probe

VI.4.1. An important drawback of arithmetic coding is that for optimal-efficiency coding the occurrence probability of individual symbols appearing in the data to be coded should be known. In principle, it would be possible to take into account multiple symbols that have already occurred. It would be even more effective to watch not only individual symbols, but occurrence frequencies of different symbol groups. This, however would require the storing of a very high number of frequency values. This may be alleviated to some extent, by storing, instead of all the possible combinations of symbols which have already occurred (contexts), only those symbol combinations that have in fact occurred.

That means that an extra symbol (escape) should be introduced to indicate the occurrence of a new symbol combination.

Known coding methods, primarily the PPM (prediction by partial match) method examines symbol combinations of varying length. When a received symbol is coded, first the longest allowed combination is tested. The newly arrived symbol is added to the stored symbol group, and a search is performed with the current symbol group length to establish if the current group has already occurred. For instance, if the group length is 4, then the three most recent symbols will be tested together with the newly arrived one. If the symbol combination has already occurred, it is coded using the momentary or constant probability value assigned to that given symbol combination. If, on the other hand, the combination has not yet occurred, an escape symbol is coded to indicate (for the decoder) that the combination is new, and the search is carried on with a shorter combination length.

In case the received symbol has not been coded in any previous combination, it is coded using the average of occurrence probabilities assigned to individual symbols. After the coding has been completed, the counters measuring the occurrence counts of symbol combinations (that is, quantifying the occurrence probabilities thereof) are updated, with new combinations added if necessary.

Since this method is slow and has relatively high memory load, it is not suitable for coding video data directly.

However, according to the invention, the principle of examining varying length symbol combinations is carried over to the neural coding method applied for the present invention. It has to be noted that the idea of applying a neural network for determining the arithmetic probe value is not new. A method utilizing a neural network was implemented in 1996 by Schmidhuber and Heil. Their method, in a manner similar to PPM, watches the co-occurrence of previously received symbols and the newly arrived one, and determines the probe value accordingly. With this known solution it is not necessary to use different symbol group lengths for the search, as only those inputs of the neural network will be active where there is correlation between the currently tested combination and one of those that were "taught" earlier. That way, selection (recognition) of such symbol combinations is performed automatically. This known method is, however, of little use for practical purposes because the training process is very long. For instance, in one test case the training of the network to recognize correlations of approx. 20 kB of data required two days.

Matthew V. Mahoney (Florida Institute of Technology) took over the application of neural network technology to binary arithmetic coding (where only 0 and 1 are the symbols to be coded), using the on-line training method known from neural network theory and applying adaptive learning rate instead of a constant one.

However, even this improved method is not good enough to be directly applicable for video encoding, because the memory requirement necessary for optimal coding is too high. Mahoney's original method applied more than 258 kB of memory for coding a single level. If that is applied at 128 levels (for 128 different types of data structure, taking into account the predictions, block sizes, DC and AC coefficients, etc.) the total memory needed would be more than 32 MB. If, however, only a single level were defined for video encoding, the method would be less efficient than the conventional coding method using multiple levels.

Having considered all these problems, an inventive method is devised for determining the neural probe value. The method according to the invention can maximise entropy using as little as 1-2 kB of memory. It has been found that it is worth increasing the memory only up to approx. 16 kB, above which the improvement in coding efficiency is negligible.

VI.4.2 The method is explained in detail on the following pages. Compared to the arithmetic method presented above, the only difference is that the calculation of the probe value (the function returning the value of the "prob" variable) has been replaced by a neural probe.

Incoming bits to be coded are fed into a shift register (buffer) with a size of 32, 64 or even more bits (in the following, an example comprising a 32-bit register is presented). The contents of the register constitute the so-called window. Now, the value stored in the register (treated as a 32-bit integer) is dynamically divided into N parts using a hash function.

Consider the following definition of the hash function (provided as an example only):

adr1=register mod H0
adr2=H0−(H0*k)+((register/64)mod H1)
adr3=(H0+H1)−(H1*k)+((register/16384)mod H2)
adr4=(H0+H1+H2)−(H2*k)+((register/4194304)mod H3)

H3 is computed from previous address values, so that the range length H3, starting from (H0+H1+H2)−(H2*k) extends to the end of remaining memory (until 2048). The result of the hash function is shown in FIG. 18.

The "register" variable is the binary value currently stored in the register 150, and H0-H2 are predetermined values. For instance, the values of H0-H2 can be 256, 512, 1024, from which the value of H3 was calculated as 1536 in a concrete situation. The factor k is given by the output of the neural network. The factor k has a default value and can fall into the interval between 0 and 1.

The hash function presented above maps addresses adr1-adr4 to rows of table 155, where the table 155 consists of 2048 rows. More precisely, the mapping is to subranges 151-154, which means that address1 points to an element (table row) in subrange 151, address2 to a row in subrange 152, address3 to a row in subrange 153, and address4 to a row in subrange 154. An important feature of the inventive solution is that the subranges may overlap, thereby forming unions 156-158, this embodiment comprises three unions 156-158. As it can be understood from the above expressions, the sizes of the unions are determined by the factor k. The importance of unions increases from the least significant toward the most significant bits. The unions play an important role in the recognition of recurring bit sequences in the input stream. The role of the unions is also important because they make it possible that two addresses point to the same row of the table 155. Without going into much mathematical detail, suffice it to note here that, because the input is processed sequentially, if the first address points to a given neuron, then the weight thereof will change during the training process. In case another address selects the same neuron, the weight will change again together with the value of the bit frequency function assigned to it. Accordingly, the value of the bit frequency function associated to the neuron will also be modified twice. During the operation of the system both inputs will have the same weights.

Because the factor k is assigned a value by the output of the neural network and the actual lengths H1-H4 of the subdomains 152-154 are determined by k (indirectly, through union sizes, because union sizes affect the length of subdomains), the partitioning of table 155 into subdomains 151-154 is changing dynamically according to the output of the neural network after each received bit.

The N addresses (in this case N=4) defined by the hash function select N elements (rows) of the table 155. Each row of the table 155 contains two weight functions—quantization weight function $W_{i,Q}$ and the scale weight function $W_{i,s}$, (or, in case the scaling factor S need not be generated, only $W_{i,Q}$) and a frequency pair $f(0)_i$, $f(1)_i$ defined in the same way as in the case of the discrete algorithm (that is, frequency values are updated depending on the bit value each time a bit is received). The selected weight functions are modified during the training process as follows:

$$W_i = W_i + \left(\text{error} * \text{gain} * eta * \frac{f(0)_i + f(1)_i}{f(0)_i * f(1)_i}\right)$$

where i is the index of the addressed row of the table, "error" is the difference of the predicted and the actually received bit, "gain" is the gain factor, "eta" is the learning rate, and $f(0)$, $f(1)$ are the bit frequencies defined above. In effect, the knowledge base of the N-input neural network applied in the method is constituted by the weight functions and frequency values stored by table 155.

During operation, the output of the network according to this example is given by the formula $$out_j = \exp^{\Sigma w_i}$$

where i is the number of outputs, with the index i running from 1 to N, i. e. the output is summed for all the selected weight functions. The output of the network can be defined so that the k and "prob" values themselves appear at the output.

Again skipping the more detailed mathematical analysis, the operation of the neural network can be sketched as follows:

The probe value is 0 (corresponding to the probability 0.5) when the first bit arrives. Then the network calculates the error (error=bit-probe), and "teaches" the error to neurons assigned to the previous bit value. (In the first step these values are irrelevant. Because there are no previous data, all addresses are 0 so the 0-th neuron will be assigned to the input). Next, the system generates new addresses from the current value of the register (buffer). Weight functions (zero in the first step) of neurons selected by the addresses are then summed up and the exponential of the sum is calculated (the result in the first step is zero as well), which becomes the new probe value.

The next probe interval is −0.5 . . . +0.5, so the current probe value mapped on the 0 . . . 1 interval will be 0.5. For the following incoming bit the above process is repeated, this time with valid addresses, with the weight finctions of the neurons previously selected being modified on the basis of the error value. The process is the same for the factor k.

As we have mentioned it already, the gain and the learning rate of the system can be dynamically adjusted. In a preferred embodiment the gain is modified only in case the address selecting the neurons points to an address range within a union.

That is, a gain factor is assigned to each union according to the priority of the unions.

The learning rate is determined by the factor k and a number of external determinants.

The learning rate specifies the slope of the learning curve for the network, that is, the degree to which the error is minimized in each training cycle.

The neural network has two outputs: the output "probe" gives the arithmetic probe value, while the other output specifies the factor k that is applied for determining the partition of the unions. A possible structure of the neural network is illustrated in FIG. 18b, showing neurons of the input layer 160, and outputs 169 and 168 yielding "prob" and the factor k. The neural network shown in the figure has a hidden layer 162 as well, but the inventive method also works successfully with a simpler-structure network.

In this manner, to each row of the table constituting the knowledge base of the neural network there are assigned the frequencies f(0) and f(1) that can be regarded as counters. These counters, similar to elements of the table FreqTb1 [index], seen above, specify how many times the currently coded bit has been 0 or 1 when the given table row was selected by one of the addresses adress 1-4 pointing to subranges 151-154 produced by the subdivision of table 155. Thus, frequencies f(0) and f(1) may be stored in a table of N rows, and, similarly to the way described above, they should be re-scaled if their value exceeds a given limit.

VI.5. Next, the partitions of the register 150 are tested iteratively to select the best partition. The neural network updates frequency data f(0), f(1) of the most recently addressed table rows based on the value of the next received bit, and "teaches" to the neuron weight functions stored in these rows the last value of k and the probe factors derived from frequencies f(0), f(1) with regard to the difference (error) between the predicted and received bit value.

The operation of the system is in many respects similar to methods described above, but the dynamic register partitioning and the utilization of dynamic gain and learning rate are fundamentally novel elements.

Let us see an illustration of how efficient the method is in practice:

We coded the DCT coefficients of 20 8×8 blocks, producing 1280 bytes of data. The coded blocks were adjacent in the frame, and were practically identical. We were interested mainly in the coding efficiency of the methods in a situation where there were recurring data sequences of DCT coefficients in the different blocks, but there were no recurring sequences within individual blocks themselves.

The results are compared to other methods in the following table:

| Type | Input data | Output data |
| --- | --- | --- |
| VLC* | 1280 | 690 |
| AMT binary arithmetic model* | 1280 | 550 |
| Arithmetic (Markov model 200K) | 1280 | 350 |
| Mathews neural arithmetic 256K | 1280 | 149 |
| AMT neural arithmetic (1K) | 1280 | 76 |

*multiple-level method

With other data types the results show greater spread but our method still performs significantly better than other solutions.

VII. Bandwidth (Transfer Rate) Control and the Regulation of Compression Ratio

VII.1. Bandwidth (transfer rate) control is one of the most important issues in video encoding. The information content of frames in a video frame sequence varies to a great extent, so in case the aim is to maintain a substantially even image quality, and the compression ratio has to be adjusted over a large scale to follow these changes.

If the compressed data are stored on a storage device, the storage capacity of the device will limit the total amount of coded data. The most obvious case where the bandwidth is a constraint occurs, however, when data must be transferred in real time over a data transfer system. In that case the quality of the transferred video is limited by the available bandwidth (data transfer rate). Therefore, it is necessary to keep the transfer rate (the amount of data transferred in one second) at a near constant value. This can be achieved only by regulating the compression ratio. Hereafter, compression ratio regulation means increasing or decreasing the quantization factor. However, quantization cannot be increased without consequences. Higher quantization causes image details to disappear with the decrease of discernable spatial frequencies present in the image, with the visually perceptible error increasing at the same time. At a certain point the image inevitably falls apart into blocks and other visually conspicuous image distortions occur.

Modifying the quantization factor in accordance with the available bandwidth is known per se. In conventional solutions, the new quantization factor is calculated from the expected and actual length of the coded sequence and is applied on the next frame. Instead of taking into account only one frame at a time, the more sophisticated solutions calculate the new quantization factor using the average length and the expected average length of frames compressed in a given timeframe. These methods usually involve a reaction delay factor, specifying the time in which the control system should achieve the computed maximum value.

Such methods provide constant transfer rate or constant bit rate (CBR method).

Results can be significantly improved by setting a minimum and a maximum limit for transfer rate control, always keeping the transfer rate within these limits and attempting to achieve in the long run a dominant transfer rate equalling the mean value of the upper and lower limits.

It is preferable that the signal-to-noise ratio between the original and reconstructed frames be also taken into account as a control parameter, that is, the transfer rate should be increased (within the specific lnimts) in case the SNR deteriorates and the transfer rate may be lowered if the SNR improves. This is the so-called variable bit rate (VBR) method. A major drawback of this solution is that the total expected data length cannot be predicted exactly. Minimum and maximum values cannot be set too high, because then the control range would also be too wide and the total coded data length would vary over a too large scale. It also often happens that the desired quality cannot be maintained with the maximum transfer rate set by the system, making it necessary to further increase the transfer rate.

VII.2. According to the present invention, two solutions are provided for bandwidth,(transfer rate) control. Both methods are based on the application of a neural network.

VII.3.1. According to the first solution, the neural network has a backpropagation structure that is known per se. The network is illustrated in FIG. 18c. The network has N inputs 180l-180n, a hidden layer 185 containing 2N neurons, and at least one output. The quantization factor Q and scaling factor S (the role of which is described in detail below in section VIII.) appear at outputs 188 and 189.

In order to provide continuous control, the input of the network is the last N received data elements, which are fed sequentially to the N inputs in their order. The data elements are constituted by the ratio of expected and coded frame lengths, and these data elements are considered as a temporal sequence.

$EL_{i-1}/CL_{i-1}$, $EL_i/CL_i$, $EL_{i+1}/CL_{i+1}$, etc. ( where EL: Expected Length, CL: Coded Length, and i is the index corresponding to the i-th data (for instance, a coded frame)

Test data applied for training the network were produced using an external control system or manually prior to the beginning of the training process, with the data being reduced by complex correlation calculations to 1000-4000 training samples. Training samples are devised such that they represent every frame type occurring in an ordinary video recording. These samples are "taught" to the system through several training cycles, in a concrete implementation, 50000 cycles.

After training has been completed, the network is ready for receiving and processing real data. It should be noted that in this concrete embodiment the calculations have been established such that it was not the quantization factor Q that appeared at the output of the network, but a $k_Q$ coefficient, which was in turn used for modifying the current Q.

The main advantage of neural networks compared to discrete systems is that virtually all types of control characteristics can be implemented with them.

Control characteristics are much more important in a variable bit rate control system than in a constant bit rate control system.

VII.3.2. As we have already mentioned, the network operates with surveyed training. The neural network estimates the desired mapping with previous expected and coded frame length values, the latter being regarded as a data sequence. This method can be applied successfully in case of constant bandwidth (CBR) but is not always suitable in itself for variable bandwidth (VBR) systems. The reason for that is that VBR systems also take into account image quality.

In case the image quality exceeds the average quality value, the compression ratio is Increased, while if the quality is poorer than the average value, the compression ratio is decreased. The neural network control system must also take this into account. Therefore a minimum and a maximum quantization factor is specified for the control network, which may not be exceeded by the control system. These values take effect through the neurons designated with reference numerals 186 and 187 in FIG. 18c.

VII.3.3. The neural network applied for VBR mode has twice as many inputs as the network used for CBR mode, because, in addition to the expected/coded length ratio, data representing image quality are also fed to the input of the network in the form of expected/coded quality ratios:

$EQ_{i-1}/CQ_{i-1}$, $EQ_i/CQ_i$, $EQ_{i+1}/CQ_{i+1}$, etc.

where EQ is the expected quality, CQ is the coded quality, and i is the data index.

As seen in FIG. 18c, in addition to the output 188 determining the quantization factor, the neural network used in VBR mode may also comprise a ftrther output 189 representing the scaling factor S (the role of the latter is described later). Similarly to the above described case, the network processes the input data of expected/coded quality and expected/coded length in a time sequence during training, and estimates the sought mapping in accordance with the specified minimum and maximum values. Training data are chosen to reflect the specified control characteristics and control slope.

During the real-coding operation of the network, i. e. when real data are processed, there is no further training, and the weight functions of neurons remain constant. Coding itself is in effect an association task: the received input data contained in the time slot are mapped to the Q and S factors on the basis of what the network has "learned" during the training process. Thus, by, determining the next values of Q and S according to received length and quality data, the network performs the same task as conventional control systems. Intuitively, the time slot can be said to describe a particular situation. The network will search among situations it encountered during training for the one that best matches the current one, giving the optimal response learned in conjunction with that particular situation.

An implemented variant of the neural network substantially uses only a single formula, the so-called sigmoid sum.

$$\text{out} = 1 \Big/ \exp\left(1 + -\text{Gain} * \sum_{i=0}^{N} W_{(i)} * \text{Input}_{(i)}\right)$$

where N is the number of neurons

The "gain" value may be unity and can be determined by optimum search as its only role is to determine the order of magnitude of the output values. First, weight functions of neurons in the hidden layer(s) are summed with the above expression, then the calculation is performed for the weight functions of the output layers as well.

In their practical implementation, there is no significant difference between the VBR and CBR networks, except for the input data, which means that the network performing VBR mode can perform the functions of the CBR mode as well. For CBR-mode operation, that is achieved by simply providing a constant value at the quality inputs (at the maximum possible value, which inputs are kept constant during training as well). In CBR mode the minimum and maximum bandwidth limit inputs are set equal and are kept constant, set to values corresponding to the desired constant bandwidth.

VII.4. In this section, another variant of the improved dynamic quantization performed by a neural network is described (the so-called address decomposition method).

VII.4.1. This network model is a variety of the one presented in the section dealing with arithmetic coding. It only differis from the above network in that the addressing of certain, selected neurons of the network are determined not by the entire time window/time slot. This is illustrated schematically in FIG. 19, showing that input data examined in the time window bypass the address generator. Here, the elements of the input data sequence are not 0-s and 1-s, and therefor the address generation procedure described above cannot be applied directly. Instead, the input layer of the neural network consists of two parts. To each data value that can be found in the time window, a hash function (similar to the example illustrated above) assigns a neuron, selected from an appropriate number of neurons, such as 2048 or 256, depending on whether the incoming data is expected/coded length data or expected/coded quality data. In effect, this means two neuron weight tables, one for neurons (more precisely, for the weight functions thereof), working with expected/coded length data and another table for weight functions of neurons working with expected/coded quality data.

If the time window size is N=32, and address generation is performed using 11 and 8 bits, respectively, for the two data types, the size of the memory needed to store the input data of neurons will be Mem=2048*16+256*16 (16×11 bit-long normalized data for addresses generated from expected/coded length and 16×8 bit-long normalized data for addresses generated from expected/coded quality data)

In the used address conversion procedure, the inputs of the neural network are normalized data with values between 0 and 1, which are subsequently converted into integers for address generation.

$$C_{vk} = VK_n * 2^{11}$$

$$C_m = M_n * 2^8 \qquad \text{Equation III}$$

where $VK_n$ is the normalized expected/coded length ratio and $C_{vk}$ is the generated address, and where $M_n$ is the normalized quality and $C_m$ is the generated address.

Based on these expressions, addresses are generated from data located at each position of the time sequence. The addresses so generated than address the neurons stored in the tables. In other words, the neurons are selected by the generated addresses, and the neurons receive the ratios of expected/coded length and expected/coded quality during the training process. The system has two other inputs that are not associated with the time sequence. Similarly to the network shown in FIG. 18c, these inputs are applied for determining the minimum and maximum bandwidth. An error factor is calculated using the expression $(1/Q - 1/Q_{prev})$ i.e. the error factor is determined as the difference of the reciprocal of the current training quantization factor and the reciprocal of the previously calculated quantization factor, where $Q_{prev}$ is the previous quantization factor.

The-weight function is modified as follows:

$$W = W + \left(\frac{1}{Q} - \frac{1}{Q_{prev}}\right) * eta * \text{input}$$

(where eta is the learning rate)

$$\text{out} = \exp\left(\sum_{i=0}^{N} W_{(i)}\right)$$

where N is the number of neurons

There is no further training during the effective control operation of the network, i. e. this system also uses a pre-trained network.

The process of the control operation is identical with the training process except that weight modification is not activised.

In a manner similar to what has been described above, the system can be switched to CBR mode by fixing the min/max bandwidth and quality data at respective constant values.

This system operates flawlessly in multiple-step mode as well. The essence of this mode of operation is that in a first step, the system encodes the entire footage with a constant quantization factor (e.g. with Q set to 3) without control. In the subsequent second step coding is performed with the control system activated. This solution provides improved-precision coding because the first step specifies the degree to which each frame can be compressed, so Q need not be determined, but may be directly adapted from step 1. Otherwise, the inventive neural network can be applied without any modifications. In multiple-step mode training can be performed using fast-training procedures. Also, interpolation is highly effective in this mode: we have observed that the quality achieved in 4-6 steps by discrete control systems can be reached by the neural control system in as little as two steps.

It should be noted that, compared to the single-step moded, the multiple-step mode does not necessarily provide better quality. One of the advantages of this mode is that the length of the output can be adjusted to a predetermined value, corresponding e.g. to the capacity of a storage medium.

VIII. Dynamic Scaling

VIII.1. As it has already been indicated, it may often happen that the desired length of the coded video cannot be maintained with the desired video quality. This might be caused e g. by that the preset compression ratio is extremely high for particular sequences and so the desired image quality cannot be maintained using the currently set min/max limits of compression. Such a situation typically occurs with highly detailed and action-rich footage. As an example, the first 5 minutes of the feature film "The Mummy Returns" may be mentioned. In case of this particular sequence, a bandwidth of at least 2.5 Mbit/s would be needed for good-quality MPEG compression. However, if the available bandwidth decreases to 1.5 Mbit/s, rather complex pre- and postfiltering operations would be needed both at compression and decompression time in order to eliminate errors. This would strongly decrease image sharpness, to the extent that the quality of the coded video would barely reach the "acceptable" level.

VIII.2. In order to eliminate. the problems described above, in accordance with the present invention, the concept of dynamic scaling has been introduced. This essentially means scaling down (re-scaling) if the control system is unable to maintain the desired image quality due to fixed external boundary conditions. The frames are scaled down (re-sized) to a size that provides satisfactory results. The system compresses this reduced-size frame and, at decompression, restores it to its original size. Understandably, image quality deteriorates in this case as well, however, this will primarily appear as reduced sharpness. Blocking artefacts and other typical errors caused by the compression do not arise, at least if the compression ratio is not set extremely high.

We have examined what would happen if the amount of input data were reduced for such critical frame sequences, but the compression factors were left unchanged. With other words, the frames were scaled down to ¾ or ½ of their original size. Because the encoder strives to keep the data rate constant as far as possible, taking into consideration the image quality, reduction of frame sizes will result in a reduced degree of compression. In this manner, the amount of output data remains the same as before re-scaling.

For instance, if the entire data stream is coded with a bandwidth of e.g. 0.5 Mbit/s; and frames are reduced to half their original size in critical sequences, the actual transfer rate remains 0.5 Mbit/s, but both the compression ratio and the quantization factor are significantly reduced. In case of the above example, the-latter factors were reduced to an extent that corresponded to an image quality coded with 2 Mbit/s-bandwidth, in the original frame size. This entails a reduction of the errors. The drawback f the method is that scaling reduces the resolution of the framies. Thus, when frames are restored to the original size during decoding, the values of missing pixels must be inferred. However, this problem can be significantly reduced by applying a suitable scaling method. It must be taken into account that there are spatial frequency components in the frame, and the transformation must be performed accordingly.

VIII.3. Accordingly, in the dynamic scaling method according to the invention, we need scaled images. A number of interpolation-based frame scaling methods were tested. The Láncos method yielded the best results (the Láncos method is a resampling procedure known per se that interpolates the missing pixel by a filter, based on spatial frequency components of the image). If compression with and without scaling are compared, it turns out that without scaling, in critical sequences the quality loss can be easily perceived if the stream is compressed for a transfer rate of 0.5 Mbit/s. Many areas in the image become completely "flat", blocking artefacts and stripes appear, with image sharpness being drastically reduced in some areas as if an eraser was applied to the image. On the other hand, in case the compression is performed with the frame scaling according to the invehtion, none of these errors occur. The only perceptible error is the reduction of sharpness. However, having analyzed the sequences, it was found that scaling is typically needed at those points where fast motions occur in the video footage. Because fast-moving scenes are usually slightly blurred in the original already, the information loss caused by re-scaling is barely perceptible.

The inventive dynamic scaling procedure is performed as follows:

Each incoming frame passes through the scaling module, with a scaling factor of 0 (no scaling) at the beginning. The compression control system decides if the result of coding is satisfactory within the specified limits. If the result is not satisfactory, the frame size is changed (reduced) to a degree that provides acceptable quality even-atter decoding.

It should be noted that the scaling task can be solved, utilizing discrete methods. But, considering that a neural network has already been applied in the inventive system for bandwidth control, the scaling may be also performed more efficiently, with a neural network. As the problem is closely related to the problem of bandwidth control it has proved to be satisfactory to add another output to the neural network (see FIG. 18*c*). Thus, the network has two outputs, one providing the Q coefficient of the quantization factor, the other the scaling factor S.

In the first solution provided for bandwidth control (see section VII.3, and FIG. 18*c* a new neuron 189 may be directly inserted, its output providing the scaling factor S. However, for the second proposed solution (see section VII.4.) in practice two weight vectors should be assigned to each table address.

This practically corresponds to two independent neural networks, having identical inputs but sending different values to the outputs. To render the network more sophisticated, it is proposed to add a hidden layer to the neural network, with the neurons thereof connected to the output layer. In that case the network will have a so-called backpropagation structure. Here again, as in the previous solution, neurons of the input layer are selected by the positions pointed to by addresses generated by the system.

The scaling procedure starts at an I- (intra) frame and lasts until the next I-frame. Scaling factors determined for frames of other types are averaged. This is shown in FIGS. 20, 21 where scaling is started at A and ended at the point marked B.

X. Some General Remarks Concerning the Neural Control System Applied for the Present Invention We have tested a number of different network types for potential application with the inventive control system. Taking into account their computational load and proper control behaviour, surprisingly the best results were produced by the networks with the simplest structure. The so-called counter-propagation-type networks may also give excellent results, providing in many cases better approximation than the backpropagation-type network described above, but only if the address-decomposition method (see above) is applied Summing up, the second method.performed better than the first method, due to the fact that it uses much more neurons than its counterpart, which provides a larger knowledge base. Converted to backpropagation or counterpropagation, it provides excellent control.

The invention is essentially based on the idea of providing a control system that is capable of realizing different control characteristics, and ensuring optimal compression while also taking into account the visually perceived image quality. Different learned characteristics can be grouped into profiles that enable the selection of the characteristics most appropriate for any given video sequence. We have also tested discrete control systems and have found that they have inadequate control dynamics. For instance, if coding was carried out in two steps using medium bandwidth, there could always be found sequences that would have needed higher compression, or scenes where it would have been satisfactory to use lower compression. Known discrete coding systems are closed systems, meaning that they usually perform encoding using constant fuictions. The neural system is, however, capable of taking into account the information of previous frames and performing coding control using the learned momentary characteristics.

Because different neural network models are known per se, the operation of the inventive neural networks has not been analyzed in detail in this document. We have only provided a number of concrete implementations of neural networks adapted for coding video frame sequences.

XI.1. A Summary of the Operation of the Hybrid Video Coding System Implementing the Inventive Methods The structure of the entire system is depicted in FIG. 8 and FIGS. 22-24. During compression frames first pass through the scaling system (resampler module) 61 (FIG. 8). The system decides with which method, the coding should continue, and selects the coding mode (I, P, B) accordingly. In case of an I-frame the different predictions are carried out for each block, and the system, based on the result of variance analysis, selects the prediction promising the best compressibility. Then, blocks are transformed with DCT, are quantized and compressed at the appropriate level.

In case of a P frame only the preceding frame, while for a B frame both the preceding.:and the subsequent frames are used as reference frame for searching a matching reference block for the current block to be coded. The found block is then compensated in accordance with-the block size and position (it is subtracted from the reference block, optionally using ½ or ¼ pixel resolution search and motion compensation), then the block is predicted, transformed and coded. At the same time, the found reference positions are converted into motion vectors, and the motion vectors are subtracted from previous ones, and compressed at the appropriate level. The compression ratio is regulated by the control system in accordance with expected and coded length and quality values. If the desired quality cannot be maintained within the current limits, the frame is scaled down to a size at which the quality becomes acceptable. It has to be noted here that in the concrete implementation the system never reduced frames to smaller than half of their original size.

Surprisingly, it was found that the implemented method performed far better than expected. Above the bandwidth of 450 kB/s there are hardly any visually perceptible errors in critical sequences, apart from a reduction in sharpness caused by re-scaling. It has been found that with a transfer rate in the 380-450 kB/s range the inventive hybrid coding system provides the quality of the SP mode of an average video recorder, while in the range of 280-380 kB/s the quality corresponds to the LP mode of a common video recorder. In case the bandwidth exceeds 500 kB/s, video quality approaches DVD quality. Above the 750 kB/s limit it is practically visually indistinguishable from DVD.

A drawback of the inventive coding system is that, due to arithmetic coding, it is sensitive to errors caused by data loss in the transmission channel. However, contemporary digital transmission networks (such as the Internet) are capable of high-security and substantially loss-free data transfer, even for very high amounts of data so this drawback is not significant. For operation of the coding system with good efficiency, the frequency table should be updated continuously. If a transmission error occurs somewhere during the decoding process, then from that point on all data until the end of the affected frame will be damaged.

XI.2.1. The operation of the inventive hybrid video decoder applied for decoding data compressed with the system according to the invention is explained with reference to FIG. 22. Frame reconstruction starts by feeding encoded data into input buffer 121 and decoding the stream information block 133., The stream information block 133 contains the original size of the frame and other data that do not change in the course of decoding. Thus, the stream information block 133 is decoded only once, at the beginning of the decoding process. Next, frame header information is decoded (step 122). The frame header information block contains the current frame size, the frame type (I, P, B), quantization type, and other data pertaining exclusively to the given frame.

If the frame is an intra frame, the QuadTree structure describing block partitioning is decoded (step 123) together with the DCT coefficients and specific information pertaining to individual blocks (step 126). Next, the inverse transformations are carried out (steps 127, 128, 129) on each block, the resulting inverse transformed blocks being written into current video memory 131 storing the new frame.

In intra frames each block contains all data needed for its reconstruction (particularly the prediction type and information indicating if the block has been partitioned as a 16×16 block or as four 4×4 blocks, etc.).

In case of an inter frame, first the Quad-tree structure describing block partitioning is decoded at step 123, because this tree structure contains the data needed for the reconstruction of the block. These data are used for decoding DCT coefficients, motion vectors, and prediction codes associated to individual sub-blocks, and also for the decoding of codes identifying the reference frames that were used for coding. Inverse transformations are also carried out (steps 127, 128, 129), and then those blocks of the reference frame stored in reference memory 125, which blocks were selected using the motion vectors in step 124, are added to the inverse transformed blocks in step 130.

If the frame were coded using linear interpolation, then first the interpolated block is generated on the basis of the block selected by the reconstructed motion vectors in step 124 and the reference frames stored in the reference memory 125, and this interpolated block is then added to the inverse transformed block. Each reconstructed block is written into the current video memory 131 storing the new frame.

Both intra and inter decoded reconstructed frames are written into the reference memory 125. The reference memory 125 may contain more than one frame, depending on the furthest reference frame used during the coding process. The reference memory 125 is a circular buffer, meaning that the oldest frame is deleted each time a new frame is stored.

The next step is restoring the frame size to the original in step 132. The frame size is restored preferably with the Láncos method. Scaling is carried out both during coding and decoding by a suitable subroutine. In case there is available a hardware video source or output device which is capable of scaling, the coder or decoder needs to specify only the frame size.

XI.2.2. Neural Decoder

The neural arithmetic decoder operates in substantially the same way as the neural arithmetic coding module, since, as it is known per se, in arithmetic coding the operation of the coder is the same as that of the decoder. Because the method is adaptive, a single bit is decoded at the beginning, and the new predictor is computed using the decoded bit. For computing the predictor, the neural network used for coding can be used without any alteration. The difference between the coder/decoder manifests itself only in differences in mathematical calculations that are known per se, with other functional elements being fully identical.

Finally, a complete video coding/transcoding system is presented (see FIG. 23).

The inventive video coding system is capable of digitizing, efficiently coding and storing video signals. At the same time, it is also capable of transcoding already encoded digital video data for increased storage efficiency. For instance, such transcoding can be applied for reducing the bandwidth of MPEG transport packets of a DVB broadcast from approx 20 Mbit/s to approx. 600 Kbit/s, e.g. for recording satellite or television broadcasts. In a similar manner, the inventive high-efficiency coding method can also be used for storing, video sequences recorded with digital video cameras, even without the application of mechanical devices.

Inputs of the coding system are constituted by analogue video input 93, combined decoded MPEG digital video/audio packet input 94, and analogue audio input 105.

The coding system can be operated in the -following modes:

a, coding the signals coming from analogue video input 93 and analogue audio input 105 after digital conversion.
b, transcoding the digital video signal 94 and the audio signal, which latter is separated by demultiplexer 109 from the combined digital video/audio signal packet.

Digital video data selected by selector 96 are fed through input 97 to the coding system 98 (explained above in relation to FIG. 8). Coded video data 99 are multiplexed with digital audio data into a combined packet 101 by multiplexer 100. The digital packets, being routed by the PSC (Peripheral System Controller) 102, can be stored on hard disk 103, on an optical storage device or in semiconductor memory 104. The digital audio signal that was selected by selector 107 is coded by encoder 108 and is stored as explained above.

XI.2.3. Decoding of the stored video and audio data is illustrated in FIG. 24.

Demultiplexer 110 separates the data packet stored in semiconductor memory 104 or on hard disk 103 into coded digital video data 111 and coded digital audio data 112. The digital video data 111 are decoded by the decoding system 113 that was described above referring to. FIG. 22. Decoded video data 114 are optionally fed into filtering and scaling module 115, and then converted into an analogue video signal 117 by a D/A converter 116. Digital audio data 112 separated by demultiplexer 110 are decoded by decoder 118, and are finally converted back into an analogue audio signal 120 by D/A converter 119.

The invention is not restricted to the embodiments presented above, but other variations and implementations can also be conceived.

The invention claimed is:

1. Method implemented on a computer having a processor and a memory coupled to said processor for compressing a digitally coded video frame sequence, comprising the steps of
   a, dividing a given frame into blocks,
   b, optionally, further dividing individual blocks into smaller blocks,
   c, modifying the information content of selected blocks relying on information contained in a neighbouring block or blocks,
   d, generating transformed blocks by carrying out on the selected blocks a transformation (DCT) that-converts spatial representation into frequency representation, and finally
   e, encoding the information content of the transformed blocks by entropy coding,
   characterised by that
      i, compressibility analysis is performed on said selected blocks before carrying out the transformation specified in step d, and, depending on the result of the analysis,
      ii, steps c, and d, are carried out on the block or
      iii, optionally, the block is further partitioned into sub-blocks, and the compressibility analysis specified in step i, is performed again on the blocks resulting from individual partitioning, and
      iv, the block partitioning that will potentially yield the best results is chosen relying on results given by steps i and iii, and finally
      v, the transformation specified in step d, is carried out using the block partitioning with the best potential results, relying on the prediction specified in step c,
   wherein at least some of steps a through e are performed using said processor.

2. The method according to claim 1, characterised by that the compressibility analysis of blocks belonging to individual block partitionings is performed taking into account the content of the blocks and/or the frequency of occurrence of individual block types.

3. The method according to claim 1, characterised by that the contents of the blocks are subjected to variance analysis either directly or by way of a Hadamard filter during the compressibility analysis.

4. The method according to claim 3, characterised by that the variance analysis is carried out using the following formula:

$$\text{variance} = \frac{\sum_{j=0}^{M} pixel_j^2 - \left(\sum_{j=0}^{M} pixel_j\right)^2}{M}$$

where M is the number of elements in the given block or sub-block and pixel (i) is an element of the uncompressed block, with the computed variance value being compared with a given threshold value to establish if the variance exceeds said given threshold value.

5. The method according to claim 1, characterised by further encoding with the entropy coding specific data that are assigned to blocks with the maximum allowed block size in a given frame, the specific data representing the block partitioning of the block they are assigned to (Quadtree).

6. The method according to claim 1, characterised by that discrete cosine transform (DCT) is applied as the transformation that converts the representation in the spatial domain into a representation in the frequency domain.

7. The method according to claim 6, characterised by that DCT is applied on blocks smaller than 16×16, and a Hadamard transform is applied on blocks with a size of 16×16 pixels.

8. The method according to claim 1, characterised by that the information content of the modified (predicted) blocks is quantified during the compressibility analysis with the following formula:

$$sum_{(l)} = \sum_{i=0}^{M} \text{abs}(pixel_{(l)})^2$$

where M is the number of elements in the predicted block, and pixel (i) is an element of the predicted block, with the computed "sum" value being compared with a given threshold value or against a former "sum" value to establish if the computed "sum" value exceeds said given threshold value or said former "sum" value.

9. The method according to claim 8, characterised by that during the prediction of individual blocks prediction is carried out using multiple prediction modes, with the prediction mode yielding the lowest "sum" value being applied on the given block.

10. The method according to claim 1, characterised by that in case the occurrence count of individual block sizes establishes that the frequency of occurrence of the two most frequently occurring block sizes exceeds a given value, all blocks are replaced with blocks of the two most frequently occurring block sizes.

11. The method according to claim 1, characterised by that an error is computed during the compressibility analysis of blocks, with the blocks contributing to the error above a threshold value being divided into further sub-blocks, taking into account the computed error.

12. The method according to claim 11, characterised by that if the error exceeds a predetermined value in case of a given sub-block, that sub-block is divided into further smaller sub-blocks and the compressibility analysis is performed on the resulting block partitioning which includes the smaller sub-blocks.

13. The method according to claim 1, characterised by that blocks and sub-blocks of sizes of 16×16, 8×8, 4×4 or 2×2 are used.

14. Method implemented on a computer having a processor and a memory coupled to said processor for compressing a digitally coded video frame sequence, comprising the steps of
a, dividing a given frame into two-dimensional blocks,
b, establishing a block partitioning of the frame, in specific cases by dividing individual blocks into further sub-blocks,
c, carrying out on the information content of blocks a transformation (DCT) that converts spatial representation into frequency representation, producing thereby transformed multiple-element two-dimensional blocks and
d, modifying the elements of the transformed blocks according to external boundary conditions, and finally
e, encoding the information contained in transformed blocks by entropy coding,
characterised by that
in step d, the modification of the data in transformed multiple-element-two-dimensional blocks is modified depending on the size of the blocks and on the bandwidth available for transmitting coded data, and
wherein at least some of steps a through e are performed using said processor.

15. The method according to claim 14, characterised by that the modification of transformed blocks is a quantization.

16. The method according to claim 15, characterised by that the quantization is an MPEG quantization, according to the following function:

$$qcoeff_{(j)} = \left( \frac{(data_{(j)} * 16) + (matrix_{(j)} * 0.5)}{matrix_{(j)}} * \left( \frac{2^{17}}{QP*2} + \right) \right) 2^{17}$$

where
qcoeff (j) is an element of the transformed multiple-element two-dimensional block,
matrix (j) is an element of a matrix corresponding in size to the transformed multiple-element two-dimensional block,
QP is the quantization factor.

17. The method according to claim 16, characterised by that values of matrix (j) are taken from an empirically established matrix table, where individual elements of the table are entire matrix (j) matrices, with selection from said table being performed according to the external boundary condition specified in step d.

18. The method according to claim 17, characterised by that selection from the table is performed with respect to the value of the QP quantization factor.

19. The method according to claim 16, characterised by that the entire QP domain is divided into N subdomains with matrix tables being assigned to individual subdomains, where the size of said matrix tables corresponds to the block size, with each subdomain being assigned to a previously specified bandwidth range.

20. The method according to claim 16, characterised by that the external boundary condition of step d, is placed by available storage capacity and/or the available bandwidth.

21. The method according to claim 14, characterised by that in specific cases the information content of the selected blocks is modified prior to the transformation carried out in step c, on the basis of the information contained in previously selected image elements of a neighbouring block or blocks or the information content of a reference block included in a reference frame.

22. The method according to claim 14, characterised by that for encoding intra frames steps of the method according to method for compressing a digitally coded video frame sequence, comprising the steps of
a, dividing a given frame into blocks,
b, optionally, further dividing individual blocks into smaller blocks,
c, modifying the information content of selected blocks relying on information contained in a neighbouring block or blocks,
d, generating transformed blocks by carrying out on the selected blocks a transformation (DCT) that-converts spatial representation into frequency representation, and finally e, encoding the information content of the transformed blocks by entropy coding,
characterised by that
  i, compressibility analysis is performed on said selected blocks before carrying out the transformation specified in step d, and, depending on the result of the analysis
  ii, steps c, and d, are carried out on the block or
  iii, optionally, the block is further partitioned into sub-blocks, and the compressibility analysis specified in step i, is performed again on the blocks resulting from individual partitioning, and
  iv, the block partitioning that will potentially yield the best results is chosen relying on results given by steps i and iii, and finally
  v, the transformation specified in step d, is carried out using the block partitioning with the best potential results, relying on the prediction specified in step c are also carried out.

23. Method implemented on a computer having a processor and a memory coupled to said processor for compressing a digitally coded video frame sequence, where the information content of certain frames is encoded from the contents of the preceding or subsequent frames (reference frames), the method further comprising the steps of
  a, dividing the frame to be encoded into blocks,
  b, searching a matching reference block for the given block to be encoded in the reference image preceding or following the frame containing said block to be encoded,
  c, carrying out a compressibility analysis by comparing matched reference blocks and the block to be encoded,
  d, selecting the best reference block relying on the result of the compressibility analysis, and
  e, encoding said block using the best reference block just selected,
    characterised by that in step b, during the search for reference blocks:
    i) the block to be encoded is divided into sub-blocks,
    ii) the contents of the sub-blocks are analysed,
    iii) according to pre-defined criteria, a predetermined number of sub-blocks, preferably at least two, are selected,
    iv) a reference block search is performed using the selected sub-blocks, said search being performed in a specific search range in the selected reference frame for the reference block containing sub-blocks that differ the least from the selected sub-blocks, with the relative position of the selected blocks kept constant during said search, and
    v) the best reference block is chosen as a result of a search using the selected sub-blocks,
  wherein at least some of steps a through e are performed using said processor.

24. The method according to claim 23, characterised by that in step v) the best reference block is chosen in such a way that every time the search finds a block that is better than the current reference block, position data of the newly found block are written into a multiple-element circular buffer, with the last element of the buffer containing the position of the best sub-block.

25. The method according to claim 23, characterised by that a reference search is carried out using the entire block to be coded, and the search being performed in the vicinity of the reference block that is considered as the best reference block, and the final reference block is chosen according to the result of said search performed using the entire block to be coded.

26. The method according to claim 23, characterised by determining the absolute square difference of the block to be coded and the reference block, and deciding about the acceptability of the reference block on the basis of the determined difference.

27. The method according to claim 23, characterised by that the reference block search is performed in a filtered reference frame.

28. The method according to claim 23, wherein if the results are still not satisfactory, reference block search is carried out in search ranges located in further reference frames.

29. The method according to claim 23, characterised by that in case the search is unsuccessful in all reference frames, the block to be coded is divided into sub-blocks, with a matching reference sub-block being searched for each sub-block, said search being performed in the vicinity of the reference frame positions that are considered the best, in that reference frame which has so far yielded the best results.

30. The method according to claim 29, characterised by that in case dividing the block to be coded into sub-blocks has not produced satisfactory results, the search for reference sub-blocks is carried on in the vicinity of the best positions of other reference frames.

31. The method according to claim 29, characterised by that in case a sub-block remained erroneous, the erroneous sub-block is further divided into smaller sub-blocks, and the search is repeated.

32. The method according to claim 23, characterised by that the block to be coded is subtracted from the reference block, and the difference block is encoded in step e.

33. The method according to claim 23, characterised by carrying out on the information content of the difference block a transformation (DCT or Hadamard transform) that converts spatial representation into frequency representation, producing thereby transformed multiple-element two-dimensional blocks (matrices of DCT or Hadamard coefficients), and encoding the information content of the transformed blocks by entropy coding.

34. The method according to claim 23, characterised by that steps of the method for compressing a digitally coded video frame sequence, comprising the steps of
  a, dividing a given frame into blocks,
  b, optionally, further dividing individual blocks into smaller blocks,
  c, modifying the information content of selected blocks relying on information contained in a neighbouring block or blocks,
  d, generating transformed blocks by carrying out on the selected blocks a transformation (DCT) that-converts spatial representation into frequency representation, and finally
  e, encoding the information content of the transformed blocks by entropy coding,
  characterised by that
    i, compressibility analysis is performed on said selected blocks before carrying out the transformation specified in step d, and, depending on the result of the analysis
    ii, steps c, and d, are carried out on the block or
    iii, optionally, the block is further partitioned into sub-blocks, and the compressibility analysis specified in step i, is performed again on the blocks resulting from individual partitioning, and
    iv, the block partitioning that will potentially yield the best results is chosen relying on results given by steps i and iii, and finally v, the transformation specified in step d, is carried out using the block partitioning with the best potential results, relying on the prediction specified in step c are also carried out during the process of encoding.

35. Method implemented on a computer having a processor and a memory coupled to said processor for compressing a digitally coded video frame sequence, comprising the steps of
   a, dividing each frame into blocks that are to be separately coded,
   b, carrying out on the information content of the blocks a transformation (DCT) that converts spatial representation into frequency representation, producing thereby transformed blocks, and finally
   c, encoding the information contained in transformed blocks by entropy coding, and applying arithmetic coding as entropy coding, during which
      a bit sequence is encoded by modifying the lower and upper limit of an interval as a function of values of consecutive bits of the bit sequence, and
      the distribution of the already arrived bits of the sequence is taken into account in the function that modifies the limits of said interval,
      characterised by that
      addresses are generated from already arrived bit values of the bit sequence,
      said addresses are applied for addressing individual processing elements of a neural network comprising multiple processing elements, and
      parameters of the processing element are modified such that the frequency of individual addressing operations and the value of the currently arriving bit of the bit sequence are used as input data, and the output of the neural network is applied for determining a parameter that modifies the lower or upper limit the interval,
      after an initial learning phase involving the processing of multiple bits, the upper or lower limits of the interval being determined during the encoding of incoming bits as a function of the output of the neural network,
   wherein at least some of steps a through c are performed using said processor.

36. The method according to claim 35, characterised by that the incoming bit sequence to be encoded is fed into a buffer, and divided into multiple shorter bit sequences.

37. The method according to claim 36, characterised by that the binary value represented by the bits of the shorter bit sequences is regarded as an address.

38. The method according to claim 35, characterised by the addresses are being used for selecting rows of a table, where said table contains function values representing the frequencies of occurrence of the possible values of the current bit to be coded, as well as at least one weight function.

39. The method according to claim 38, characterised by that the weight functions of individual neurons are modified as a function of the function values representing the occurrence frequencies of the potential values of the bit to be coded.

40. The method according to claim 35, characterised by that potential address ranges of the addresses form unions with one another are at least partially overlapping.

41. The method according to claim 35, characterised by that the gain and the learning rate of the neural network are dynamically adjusted according to the boundary conditions.

42. The method according to claim 35, characterised by that the encoder is used with different levels, where parameters of each level can be adjusted separately, with a neural network operating with dedicated parameters being assigned to each level.

43. The method according to claim 35, characterised by that steps of the method according to for compressing a digitally coded video frame sequence, comprising the steps of
   a, dividing a given frame into blocks,
   b, optionally, further dividing individual blocks into smaller blocks,
   c, modifying the information content of selected blocks relying on information contained in a neighbouring block or blocks,
   d, generating transformed blocks by carrying out on the selected blocks a transformation (DCT) that converts spatial representation into frequency representation, and finally
   e, encoding the information content of the transformed blocks by entropy coding,
      characterised by that
      i, compressibility analysis is performed on said selected blocks before carrying out the transformation specified in step d, and, depending on the result of the analysis
      ii, steps c, (prediction) and d, are carried out on the block or
      iii, optionally, the block is further partitioned into sub-blocks, and the compressibility analysis specified in step i, is performed again on the blocks resulting from individual partitioning, and
      iv, the block partitioning that will potentially yield the best results is chosen relying on results given by steps i and iii, and finally
      v, the transformation specified in step d, is carried out using the block partitioning with the best potential results, relying on the prediction specified in step c are also carried out during the process of encoding.

44. Method implemented on a computer having a processor and a memory coupled to said processor for compressing a digitally coded video frame sequence, comprising the steps of
   a, dividing a given frame into two-dimensional blocks,
   b, carrying out on the information content of blocks a transformation (DCT) that converts spatial representation into frequency representation, producing thereby transformed multiple-element two-dimensional blocks and
   c, modifying the elements of the transformed blocks according to external boundary conditions, and finally
   d, encoding the information contained in transformed blocks by entropy coding,
      characterised by that
      modification of the data of the transformed multiple-element two-dimensional blocks is carried out in step c, as a function of the output of a neural network,
   wherein at least some of steps a through d are performed using said processor.

45. The method according to claim 44, characterised by that the neural network has back propagation or counter propagation structure, or is a simple network composed of multiple neurons, where,
   normalized values of expected/coded length and, expected/coded quality are used as input data,
   a specific number of previously received input data and the current input data are stored in a time window (time slot), with the data contained in the time window being assigned to the input neurons of the neural network.

46. The method according to claim 45, characterised by that the number of neurons in the input layer of the network equals the number of data elements stored in the time window.

47. The method according to claim 46, characterised by that the network comprises a hidden layer.

48. The method according to claim 47, characterised by that the number of neurons in the hidden layer is larger than the number of neurons in the input layer.

49. The method according to claim 44, characterised by that normalized expected/coded length values and expected/coded quality values are applied as input data, a predetermined number (N) of previously received input data elements (preferably N=31 or N=63) are stored in a time window together with the current input data, and generating addresses based on the data contained in the time slot, input data are rounded off to a given bit length for the address generation process, an address is generated from each element of the time window by means of a hash function, said address pointing to an element of a table corresponding to one of the processing elements of the network.

50. The method according to claim 49, characterised by that the neural network is pre-trained utilizing the expected/coded length and quality data in their original form, before they are rounded off for address generation.

51. The method according to claim 49, characterised by that addresses are generated by means of a hash function from the data contained in the time window.

52. The method according to claim 44, characterised by that minimum and maximum allowed bandwidth values are applied as input data for two processing elements that are independent from the rest of the neural network.

53. The method according to claim 52, characterised by that results generated by the processing elements of the network and the two independent processing elements appear at two outputs.

54. The method according to claim 52, characterised by that the output of the neural network is a frame size scaling factor and/or a quantization factor.

55. The method according to claim 52, characterised by that the output of the neural network is a frame size scaling factor and/or a quantization factor.

56. The method according to claim 44, characterised by that steps of the method according to for compressing a digitally coded video frame sequence, comprising the steps of a, dividing a given frame into blocks, b, optionally, further dividing individual blocks into smaller blocks, c, modifying the information content of selected blocks relying on information contained in a neighbouring block or blocks, d, generating transformed blocks by carrying out on the selected blocks a transformation (DCT) that-converts spatial representation into frequency representation, and finally e, encoding the information content of the transformed blocks by entropy coding, characterised by that i, compressibility analysis is performed on said selected blocks before carrying out the transformation specified in step d, and, depending on the result of the analysis ii, steps c, (prediction) and d, are carried out on the block or iii, optionally, the block is further partitioned into sub-blocks, and the compressibility analysis specified in step i, is performed again on the blocks resulting from individual partitioning, and iv, the block partitioning that will potentially yield the best results is chosen relying on results given by steps i and iii, and finally v, the transformation specified in step d, is carried out using the block partitioning with the best potential results, relying on the prediction specified in step c are also carried out during the coding process.

57. Apparatus for encoding digital video data, characterised by that comprising a unit adapted for performing the steps of the method according to claim 1.

58. A non-transitory computer-readable medium storing a program containing instructions which, when executed by at least one processor, causes the processor to perform the steps of the method of claim 1.

59. A transmitter, comprising a processor operable to generate a coded sequence by performing the compression method according to claim 1.

60. Method for decompressing encoded video data from a coded sequence produced by the compression method according to claim 1.

* * * * *